United States Patent [19]
Sawada et al.

[11] Patent Number: 5,650,708
[45] Date of Patent: Jul. 22, 1997

[54] INVERTER CONTROL APPARATUS USING A TWO-PHASE MODULATION METHOD

[75] Inventors: Takeshi Sawada, Anjo; Hiroshi Fujita; Hiroya Tsuji, both of Kariya; Kanji Takeuchi; Tsuneyuki Egami, both of Gamagori, all of Japan

[73] Assignee: Nippondenso Co., Ltd., Kariya, Japan

[21] Appl. No.: 401,988

[22] Filed: Mar. 10, 1995

Related U.S. Application Data

[63] Continuation-in-part of Ser. No. 161,853, Dec. 6, 1993, abandoned.

[30] Foreign Application Priority Data

Dec. 8, 1992  [JP]  Japan ................................. 4-328107
Oct. 20, 1993  [JP]  Japan ................................. 5-262665
Mar. 10, 1994  [JP]  Japan ................................. 6-039938

[51] Int. Cl.$^6$ ..................................................... H02P 7/00
[52] U.S. Cl. ...................................... 318/801; 318/811
[58] Field of Search ................................ 318/722, 723, 318/798–815, 276, 278, 270, 271; 363/40, 41, 16, 21, 26

[56] References Cited

U.S. PATENT DOCUMENTS 4,409,535  10/1983  Hickman .................................. 318/811
4,419,615  12/1983  Muto et al. .............................. 318/811
4,641,075  2/1987  Asano et al. .
4,734,633  3/1988  Ono et al. ................................ 318/723
4,779,183  10/1988  Mutoh et al. ............................ 363/41
4,808,903  2/1989  Matsui et al. ........................... 318/800
4,847,743  7/1989  Kamiyama .

FOREIGN PATENT DOCUMENTS 556649  3/1993  Japan .

*Primary Examiner*—Jonathan Wysocki
*Attorney, Agent, or Firm*—Cushman, Darby & Cushman IP Group of Pillsbury Madison & Sutro LLP

[57] ABSTRACT

An inverter control apparatus for driving a polyphase AC motor for preventing abrupt changes in motor drive currents when switching of one phase is stopped. The apparatus includes a signal generator for generating duty signals of drive signals of respective phases on the basis of a generated reference waveform and a signal modifier for selecting one of the duty signals of one phase, holding it at a predetermined level, and modifying the duty signals of other phases according to the value required to hold the selected duty signal. On the basis of three-phase signal voltage levels, a decision is made on voltage fixing phase intervals by a phase decision circuit, and shift values are determined by an adder at every voltage fixing phase interval. Shift values are selected by a multiplexer according to the outputs of the phase decision circuit and added to triangular wave voltage. Resultant sum values are compared with the three-phase signal voltages to form a three-phase PWM signal.

26 Claims, 25 Drawing Sheets

(a) U-PHASE CURRENT (b) V-PHASE CURRENT (c) W-PHASE CURRENT

FIG. 21A
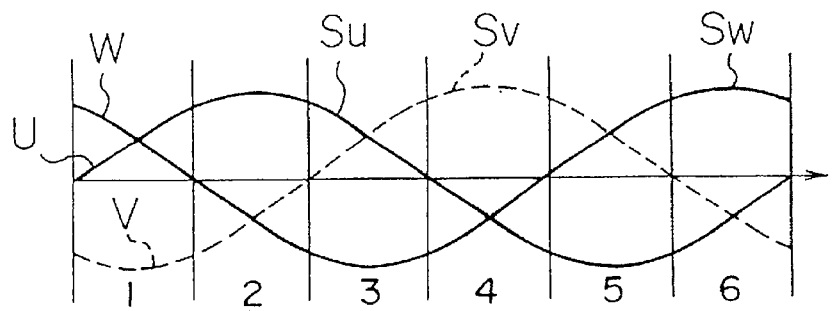
FIG. 21B
| MODE | SU | SV | SW |
|---|---|---|---|
| 1 | 0 | 1 | 0 |
| 2 | 0 | 1 | 1 |
| 3 | 0 | 0 | 1 |
| 4 | 1 | 0 | 1 |
| 5 | 1 | 0 | 0 |
| 6 | 1 | 1 | 0 |
FIG. 21C
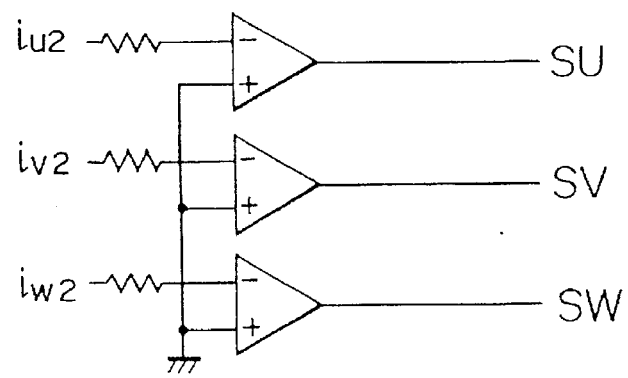

U-PHASE PWM WAVEFORM

| MODE | CODE | SHIFT VALUE |
|---|---|---|
| 1 | 010 | $V_V + V_P$ |
| 2 | 011 | $V_U + (-V_P)$ |
| 3 | 001 | $V_W + V_P$ |
| 4 | 101 | $V_V + (-V_P)$ |
| 5 | 100 | $V_U + V_P$ |
| 6 | 110 | $V_W + (-V_P)$ |

F I G. 26
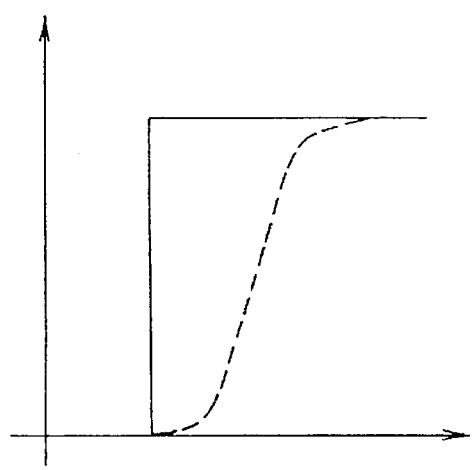
F I G. 27
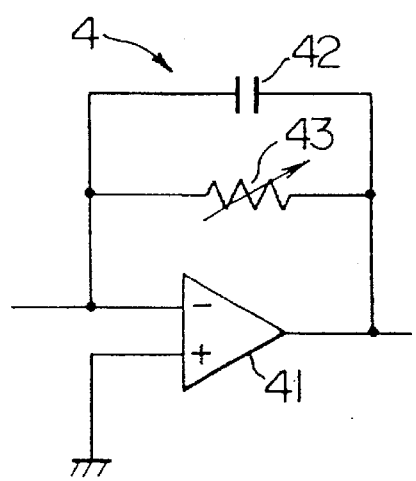

| MODE | CODE | SHIFT VALUE (OFV) | COMPARATOR DUTY | | |
|---|---|---|---|---|---|
| | | | 31 | 32 | 33 |
| 1 | 010 | Sv +Vp | | 0 | |
| 2 | 011 | Su +(-Vp) | 100 | | |
| 3 | 001 | Sw +Vp | | | 0 |
| 4 | 101 | Sv +(-Vp) | | 100 | |
| 5 | 100 | Su +Vp | 0 | | |
| 6 | 110 | Sw +(-Vp) | | | 100 |
| | | | U-PHASE | V-PHASE | W-PHASE |

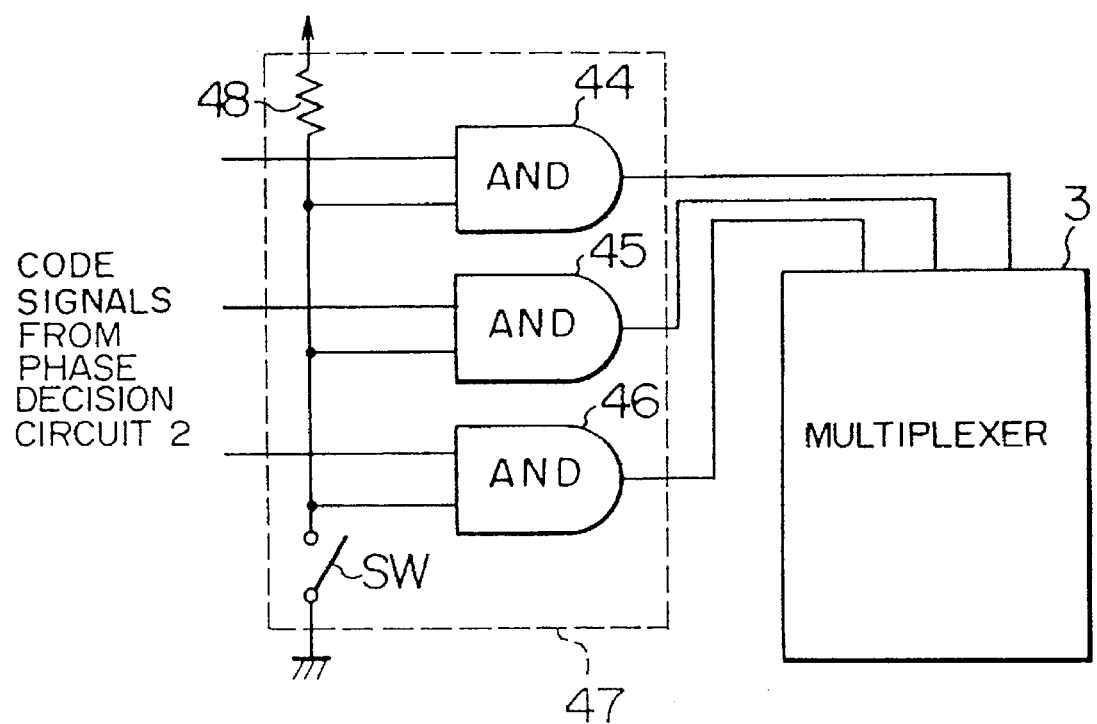
F I G. 37

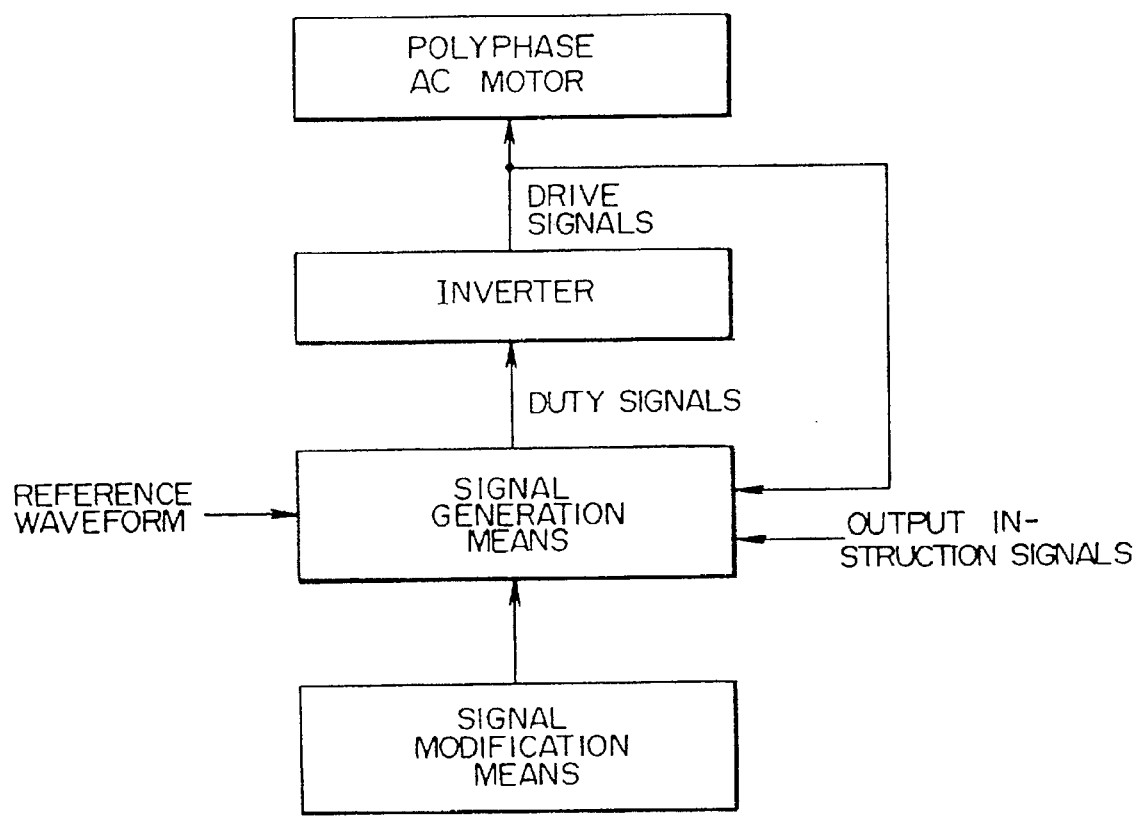
F I G. 39

INVERTER CONTROL APPARATUS USING A TWO-PHASE MODULATION METHOD

CROSS-REFERENCE TO RELATED APPLICATIONS

This application is a continuation-in-part of earlier filed application Ser. No. 08/161,853 entitled by "Inverter Control Apparatus" filed on Dec. 6, 1993 now abandoned.

The disclosure of that application is incorporated herein by reference.

BACKGROUND OF THE INVENTION

1. Field of the Invention

The present invention relates to an inverter control apparatus, and in particular to an inverter control apparatus using a two-phase modulation method whereby the voltage duty ratio of a certain phase of an inverter is fixed to 0% or 100% at a predetermined phase.

2. Description of the Related Art

For PWM control apparatuses of three-phase inverters, a two-phase modulation method capable of decreasing the electromagnetic noise and chopping loss and increasing the power conversion efficiency has been conventionally advocated. According to this two-phase modulation method, the voltage level of a certain phase out of three phases is fixed to a high level or a 0 level and modulation is performed by using two remaining phases. A typical two-phase modulation method is disclosed in U.S. Pat. No. 4,641,075 by Asano et al.

In the above described known two-phase modulation method, switching devices of output stage of each phase of a three-phase inverter are controlled to be opened and closed according to a current difference between a current instruction value of each phase and a detected current value of each phase, thus controlling the duty ratio of three-phase voltage applied to the terminals of each phase of a three-phase load by the output stage of each phase of the three-phase inverter. In this case, generation of undesired voltage vectors is reduced by fixing current instruction values of respective phases to their maximum value during respectively different predetermined phase intervals.

Furthermore, it is assumed in the above described known two-phase modulation method that the power factor of the load is constant and the ideal phase voltage associated with a current instruction value can be easily estimated on the basis of the output current instruction value. Supposing an interval during which the ideal phase voltage estimated from a known power factor θv of the load regarded as constant assumes its peak, the amplitude of the current instruction value of its phase is fixed to its maximum value during the interval and the current instruction value of each phase is provided with a sine waveform during remaining intervals. During an interval that the ideal phase voltage assumes its peak, therefore, the voltage of the phase associated with a fixed current instruction value is fixed to the maximum value. As a result, the applied voltage of each phase is somewhat distorted, but has a waveform substantially equivalent to that of a three-phase AC voltage. So long as detected current values of the two remaining phases exactly follow the current instruction values, the detected current value of the phase associated with the fixed current instruction value should have a sine waveform.

Thus, in the two-phase modulation method disclosed in U.S. Pat. No. 4,641,075, the ideal phase voltage for a given current instruction value is estimated on a certain supposition and the current of a certain phase is fixed to the maximum value during a certain interval on the basis of this supposition. The two-phase modulation method has the following problems.

A first problem will now be described. In conventional motors, the phase angle (also referred to as phase difference) of a load current flowing through the load and voltage applied to the load varies according to the magnitude of the load current and the frequency of voltage applied to the load. (The internal impedance of the motor varies according to the magnitude of the load current. The internal impedance of the motor varies according to the frequency.) In the case where the phase difference is supposed to be constant as described above, therefore, the phase voltage of that load cannot be fixed to the maximum value in the interval during which the voltage applied to the load assumes its peak. As a result, distortion of the voltage waveform applied to the load (motor) increases, resulting in a lowered efficiency, heat generation, and increased noise. That is to say, a favorable result is obtained when phase difference is supposed to be constant. Under some power factors of the motor, however, the voltage of the phase is fixed to the maximum value a timing where the voltage duty ratio should not assume a high level.

A second problem will now be described. The above described first problem has been described as to the case where the control system is handled as an AC circuit for processing sine wave signals. As a matter of fact, however, the waveform to be processed becomes a non-sinusoidal waveform. To be precise, therefore, it becomes necessary to consider the response delay of the transfer function in the impedance system, including reactance of the motor. That is to say, delay of the detected current based on transfer phase delay of the control system as compared with the current instruction value further increases phase deviation of the phase of the actual phase voltage shifted by an actual phase difference as compared with the phase of the detected current from the phase of the phase voltage shifted by a predetermined (prospective) phase difference as compared with a current instruction value of a certain phase.

The aforementioned problems will further be described. In the conventional two-phase modulation method, duty ratio control of an inverter is effected on the basis of deviation of the current instruction value, which typically has a sine waveform, from the detected current (also referred to as actual current value). Thereby the voltage applied to the motor is controlled.

In the impedance system including the reactance of the motor, the detected current (actual current value) is delayed by a predetermined phase angle from the applied voltage having a sine waveform as described above. In the impulse response, a predetermined response delay is caused. Therefore, the impedance system has a characteristic where the response performance of the above described deviation, i.e., response performance of the detected current to a change of applied voltage is worsened considerably.

In the conventional technique, therefore, the phase of the above described deviation of the detected current from the current instruction value (or voltage applied to the load proportionate thereto) is shifted so as to put voltage of a certain phase ahead of the current instruction value of that phase by a predetermined fixed phase difference. However, the phase of deviation (or applied voltage proportionate thereto) is not shifted with respect to the above described problem of occurrence of deviation from the phase difference and the problem of the above described impulse response delay characteristic of the actual current value. Therefore, there occurs a problem that this response delay cannot be compensated in phase. As a result of them, distortion of the applied voltage waveform is increased and the actual current value is also distorted thereby. This resulted in a problem of occurrence of noise and a lowered efficiency.

By the way, there is disclosed by Kamiyama in U.S. Pat. No. 4,847,743 a method for reducing the switching loss of the two-phase modulation method and minimizing the distortion factor of the output voltage. According to Kamiyama's method, a two-phase modulation circuit and a three-phase modulation circuit are provided and used in combination.

SUMMARY OF THE INVENTION

In view of the above described problems, the present invention has been made. An object of the present invention is to provide an inverter control apparatus which employs a control method of fixing the conduction states of terminals of respective phases of the load successively to a predetermined value during respective mutually different phase intervals and which reduces the distortion of waveform of voltage applied to the load. Therefore, the present invention utilizes the fact that phase deviation of output voltage from the deviation signal is reduced in an inverter in which the duty ratio of the output voltage is determined on the basis of the deviation signal. Thus in accordance with the present invention, the timing of fixing the duty ratio is determined by observing the deviation signal.

Another object of the present invention is to provide an inverter control apparatus capable of utilizing two modulation methods easily without providing a two-phase modulation circuit and a three-phase modulation circuit separately.

In order to achieve the above described objects, an inverter control apparatus for driving a polyphase AC motor according to the present invention includes an inverter for outputting a plurality of drive signals associated with respective phases of this polyphase AC motor, signal generation means for receiving drive instruction signals to control respective phases of the inverter and for generating duty signals associated with respective phases to drive the inverter on the basis of the drive instruction signals and a reference waveform, and signal modification means for selecting one of the duty signals associated with respective phases, fixing the selected duty signal under a predetermined condition, and modifying duty signals of other phases according to an amount required for fixing the selected duty signal.

In the inverter control apparatus of the present invention, duty waveforms are generated by the signal generation means on the basis of the drive instruction signals and the reference waveform, and the inverter is controlled on the basis of the duty waveforms to drive the motor. By fixing any one of duty waveforms in this control and modifying duty signals of other remaining phases according to the quantity required for fixing the one of the duty signals, the amount of change of the drive signal flowing through the motor caused by fixing one of the duty signals can be compensated for by drive signals of other phases.

In driving the motor, therefore, the drive instruction signal of only one phase is not changed with respect to the sine waveform in order to fix the duty signal, unlike the conventional technique. In the present invention, not only is the duty signal of the phase to be fixed but also duty signals of remaining phases are changed according to the amount required for fixing the duty signal. Thereby, incomings and outgoings of drive signals flowing through the entire motor can be made constant. This results in an effect of improved motor controllability.

Furthermore, in this inverter control apparatus, drive instruction signals can be subjected to two-phase modulation control as sine waveforms identically with drive signals. By detecting drive signals and comparing the drive signals with the drive instruction signals to effect feedback control, therefore, controllability of the motor can be further improved.

A second inverter control apparatus according to the present invention is an inverter control apparatus capable of performing two-phase modulation by applying three-phase AC voltage subjected to pulse width modulation to a motor, changing the frequency of the three-phase AC voltage to control the rotational speed of the motor, and fixing switching devices associated with specific devices among switching devices included in the inverter to the full conduction state or full cutoff state. The second inverter control apparatus includes means for outputting an accelerator signal, the acceleration of the motor being determined by the accelerator signal, current detection means for detecting currents of at least two phases flowing from the inverter to the motor, means for generating current instruction values of at least two phases determined according to the accelerator signal for accelerating the motor, the current instruction values of at least two phases including sine wave signals mutually differing in phase by a predetermined angle, deviation signal detection means for detecting deviation signals of respective phases representing deviations of detected current values detected by the current detection means from the current instruction values, phase decision means for deciding which modes the phases of either the current instruction values or the deviation signals correspond to and generating mode signals, means for generating a triangular wave signal, means for calculating shift values respectively of the modes from the triangular wave signal and the deviation signals, means for selecting a specific shift value out of the shift values according to the mode signals, means for calculating pulse width modulation signals from the specific shift value, the triangular wave signal, and the deviation signals, and gate drive means for supplying the pulse width modulation signals to the inverter as gate signals.

In this inverter apparatus, the shift value of each mode can be determined on the basis of the generated triangular wave signal and deviation signal. Therefore, the needed pulse width modulation signal can be derived easily and accurately.

In an inverter control apparatus according to another embodiment of the present invention, means for detecting the number of revolutions of the motor is further included and the current instruction value is determined on the basis of the number of revolutions of the motor in addition to the above described accelerator signal. Thereby, control precision is improved.

Another inverter control apparatus according to the present invention includes an inverter for applying voltages of respective phases to terminals of respective phases of a polyphase AC motor, current detection means for detecting currents flowing through terminals of at least two phases of the motor, current instruction value generation means for outputting current instruction values representing currents to flow through the motor, signal generation means for effecting opening/closing control on the inverter on the basis of deviation signals depending upon deviations of the detected currents from the current instruction values and determining waveforms of the voltages of respective phases applied to terminals of respective phases of the motor, and signal modification means for fixing operation states of output stages of respective phases of the inverter successively to constant levels for respective modes indicating mutually different phase intervals determined in relation to the deviation signals.

As for state variables relating to phases between voltages of respective phases, it is possible to adopt phase relations between the deviations of phases, phase relations between deviations of phases already subjected to PI processing obtained by performing PI processing on the deviations of phases, or phase relations between voltages applied to the motor (line voltages of phases). As a matter of course, it is also possible to extract low frequency components of these signals and remove high-frequency noise components.

In this inverter control apparatus, opening/closing control is effected on the inverter on the basis of deviations of the detected currents from the current instruction values, and waveforms of the voltages of respective phases are determined.

Furthermore, according to the two-phase modulation method of the present invention, operation states of output stages of respective phases of the inverter are successively fixed to constant levels for mutually different phase intervals on the basis of state variables relating to voltages of respective phases.

Therefore, it is possible to largely reduce occurrence of problems caused by a change of phase difference between applied voltage (phase voltage) and flowing current (detected current) and phase deviation of the detected current from the current instruction value resulting from the electric response delay of the motor. These problems could not help becoming serious problems in the conventional technique.

Furthermore, phase intervals are determined on the basis of a deviation waveform containing the response delay of the detected current as compared with the current instruction value, and voltage fixing control is effected for each of these phase intervals. Therefore, it is possible to reduce the effect of the above described response delay.

According to an aspect of the invention, the signal modification means determines phase intervals for fixing output states, i.e., output voltage values of respective phases of the inverter, on the basis of deviations of the detected currents from the current instruction values. Voltage waveforms of respective phases are originally determined on the basis of the above described deviations. By determining phase intervals for fixing voltages of respective phases on the basis of deviations, therefore, voltage fixing becomes possible without incurring complication of the circuit configuration and without causing phase deviation between original waveforms and voltage fixing waveforms of of respective phases. Eventually, the two-phase modulation method having no phase deviation is realized.

According to another aspect, the current instruction values remain sine waveforms, which makes voltage fixing manipulation as disclosed in aforementioned U.S. Pat. No. 4,641,075 unnecessary. Processing for synthesizing the current instruction values relating to feedback control is thus facilitated.

According to another aspect, voltage of each phase is fixed to its maximum voltage level or minimum voltage level for respective phase intervals. The amplitude change ratio of the voltage of each phase at its peak is small. Therefore, distortion of the voltage of each phase outputted from the inverter is reduced. According to a further preferred aspect, six phase intervals for voltage fixing are set in one period for three-phase AC voltage. In respective peak intervals ($\pi/3$ or less) of the maximum value or minimum value of the original voltage waveform of each phase having a sine waveform, the above described phase interval for voltage fixing is set. The above described minimum value means the negative maximum value from the viewpoint of alternating current. By doing so, a two-phase modulation method can be realized while reducing distortion of three-phase AC voltage.

Furthermore, the above described deviation, especially the high-frequency noise component contained in the detected current, is not fed back and control is stabilized. Even if a low-frequency component of the detected current is extracted instead of extracting the low-frequency component of deviation, the same effect is obtained. This is effective in case the current instruction value becomes a normal sine waveform. It is desirable to cut off high-frequency components of the deviation or detected current which are at least six times higher and preferably at least four times higher in frequency than the current instruction value.

According to a further aspect, the signal modification means detects deviations of the detected currents from the current instruction values for respective phases. Among the deviations of respective phases, the signal modification means fixes the phase of a deviation which is opposite in positive/negative sign to deviations of two other phases. The voltage fixing phase and its phase interval can thus be determined easily.

According to still another aspect, the signal modification means fixes operation states of output stages of respective phases of the inverter successively to constant levels. According to the quantity required for this fixing, the signal modification means modifies voltage waveforms of other phases. Since voltage waveforms of other phases are modified according to the quantity required for fixing the fixing phase, the voltage modification quantity of the fixing phase can be compensated by the voltage waveforms of other phases. Controllability of the motor can thus be improved.

According to still another aspect, the signal generation means determines voltage waveforms of respective phases on the basis of the deviations and a reference waveform. And the signal modification means fixes the voltage waveform by changing over the level of the reference waveform and modifies voltage waveforms of other phases. Since the voltage waveform is determined on the basis of the reference waveform including a triangular wave, and voltage waveforms of respective phases are modified by changing over the level of this reference waveform, the voltage modification quantity of the fixing phase can be compensated by voltage waveforms of other phases easily and certainly.

According to still another aspect, the signal modification means includes difference calculation means for calculating the difference between the deviation of the fixed phase and the peak value of the reference wave-form, and changeover means for offsetting the reference waveform according to the difference calculated by the difference calculation means. On the basis of the offsetted reference waveform, duty signals of other phases are generated. Since the voltage waveforms are modified by offsetting the reference waveform, the voltage waveforms of respective phases can be modified easily.

According to still another aspect, signal modification inhibiting means for inhibiting the signal modification means from fixing voltage waveforms is provided. Since the signal modification inhibiting means for inhibiting fixation of voltage waveforms is provided, changeover from the two-phase modulation method to the three-phase modulation method can be conducted at an arbitrary timing to effect control.

BRIEF DESCRIPTION OF THE DRAWINGS

FIG. 21A is a diagram showing relations between signal voltage waveforms of respective phases and modes;

FIG. 21B is a diagram showing three-bit code signals representing modes;

FIG. 21C is a diagram showing a phase decision circuit;

FIG. 26 is a diagram showing a current waveform in the third embodiment;

FIG. 27 is a configuration diagram showing an integrator 4 in the third embodiment;

FIG. 37 is a diagram showing a changeover circuit between a two-phase modulation method and a three-phase modulation method in a sixth embodiment;

FIG. 39 is a block diagram showing the present invention.

DESCRIPTION OF THE OF THE PREFERRED EMBODIMENTS (First Embodiment)

Embodiments of an inverter control apparatus according to the present invention will hereafter be described by referring to drawings.

Figure 13:
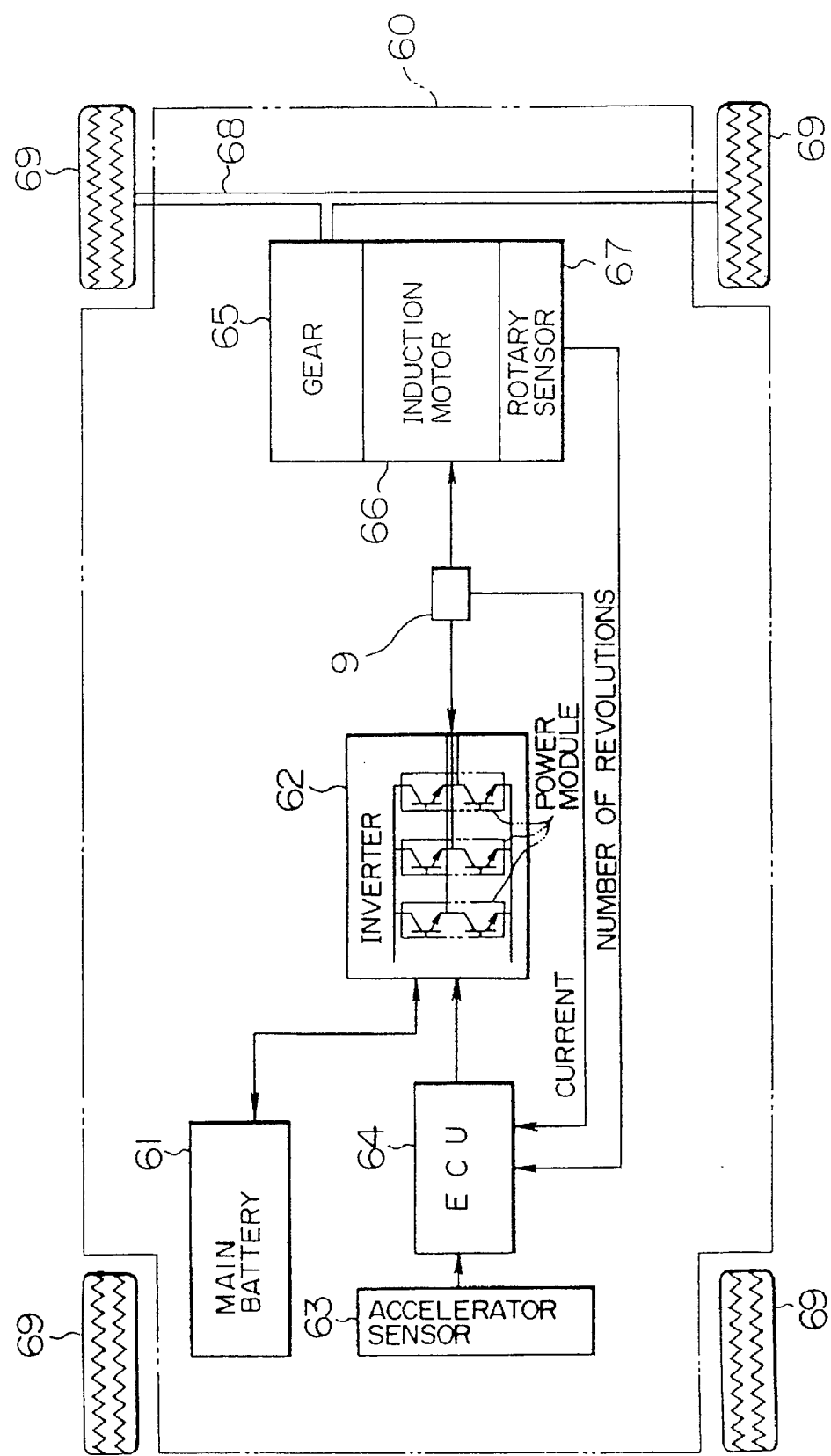
FIG. 13 is an entire configuration diagram of a conventional electric automobile.

FIG. 13 shows an entire configuration diagram of an electric automobile. In FIG. 13, an electric automobile 60 includes a main battery 61, an inverter 62, an accelerator sensor 63, an ECU (electronic control unit) 64 functioning as a control unit, a gear 65, an induction motor 66, a rotary sensor 67, a suspension 68, and a traveling tire 69.

Figure 14:
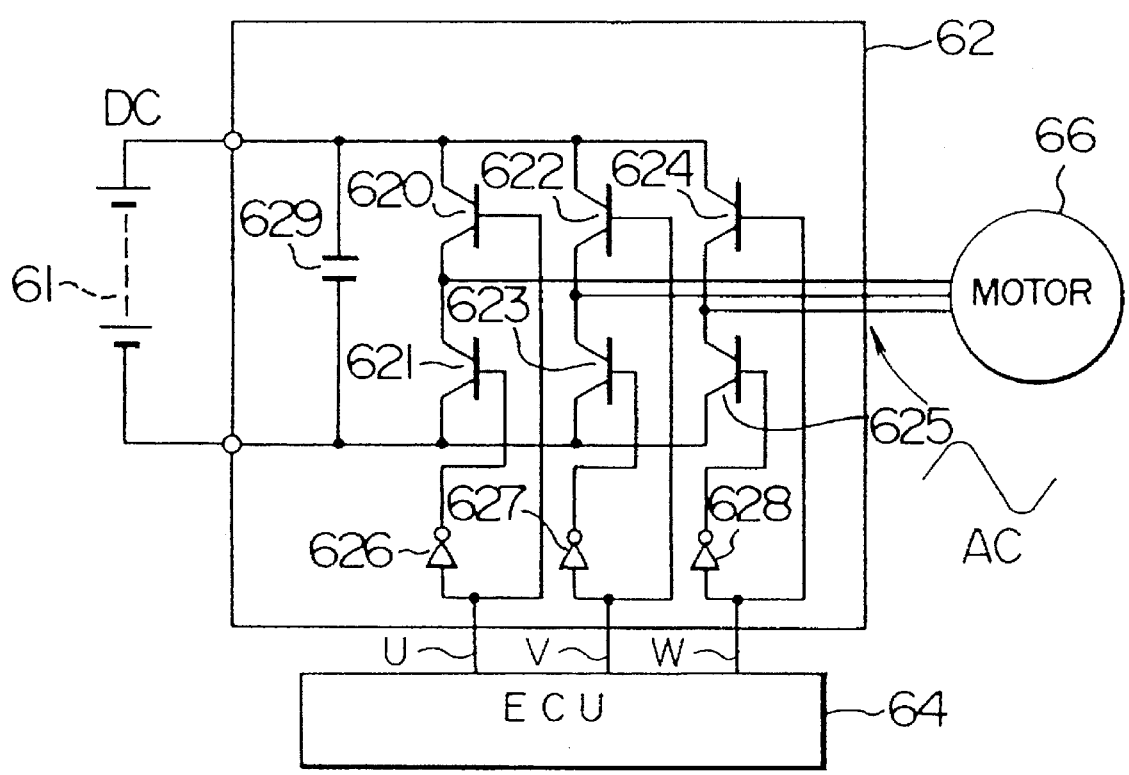
FIG. 14 is an internal configuration diagram of a conventional inverter.

As shown in FIG. 14, the inverter 62 includes six transistors (IGBT: insulated-gate bipolar transistors) 620 through 625 functioning as switching elements, three negation logic elements 626 through 628, and a smoothing capacitor 629.

The inverter 62 is controlled on the basis of control signals U, V and W of respective phases out-putted by the ECU (referred herein to inverter control apparatus). Waveforms of the control signals U, V and W of respective phases are formed by controlling duty ratios (pulse width/pulse period) of pulse signals having a predetermined carrier frequency.

Figure 5:
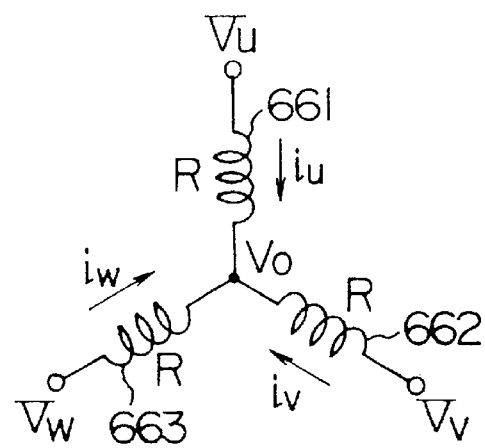
FIG. 5 is a conventional three-phase circuit diagram used for describing the embodiment.

As shown in FIG. 5, the motor 66 has coils 661 through 663 of three phases. The motor 66 is driven by excitation of the coils 661 through 663.

The principle of inverter control of a two-phase modulation method according to the present invention will hereafter be described.

Figure 2:
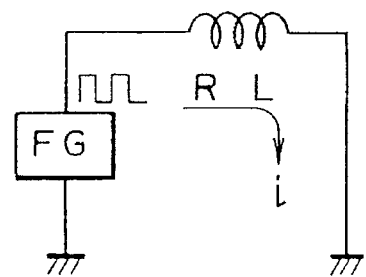
FIG. 2 is a diagram showing an example of a conventional circuit having an integral element.
Figure 3:
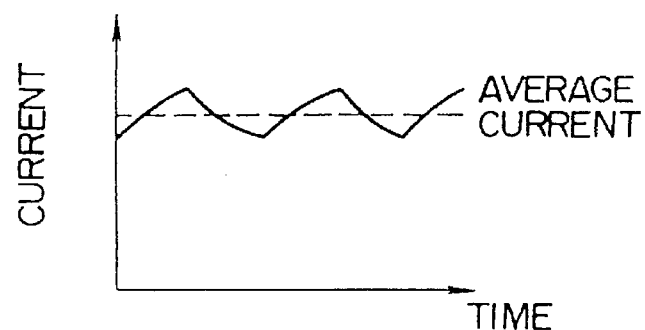
FIG. 3 is a diagram showing a conventional current waveform obtained when pulse voltage is applied to the circuit of FIG. 2.
Figure 4:
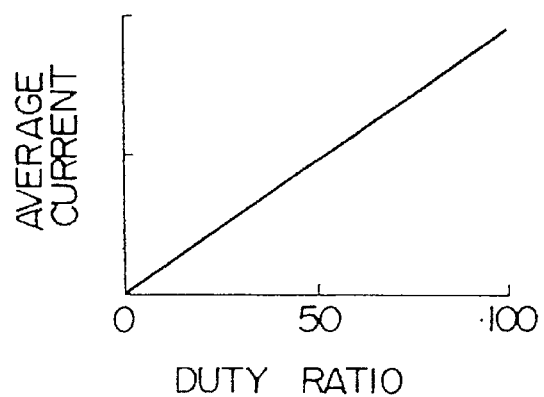
FIG. 4 is a diagram showing the conventional relation between the duty ratio of the pulse voltage and an average current.

In general, when pulse voltage is applied to a circuit having an integral element as shown in FIG. 2, the current flowing through the circuit has a waveform as shown in FIG. 3. As shown in FIG. 4, its average current increases or decreases in proportion to the duty ratio of the applied pulse voltage. The average current can also be changed by changing a terminal voltage $V_B$. Therefore, voltage $V_O$ corresponding to the average current can be represented by the following expression (1). In the expression, "duty" is a duty ratio.

$$V_0 = V_B \cdot \text{duty} \qquad (1)$$

It is now assumed that terminal voltages in the circuit of star connection as shown in FIG. 5 are Vu, Vv and Vw, and currents flowing through the circuit are $i_u$, $i_v$ and $i_w$. From Kirchhoff's law, the following conditions hold true. Since each of $i_u$, $i_v$ and $i_w$ is an average current, the load is also made to be an R component.

$$\left.\begin{array}{l} i_u + i_v + i_w = 0 \\ V_u - V_o = R \cdot i_u \\ V_v - V_o = R \cdot i_v \\ V_w - V_o = R \cdot i_w \end{array}\right\} \qquad (2)$$

Denoting duty ratios of phases u, v and w by $d_u$, $d_v$ and $d_w$, respectively, the terminal voltage values of respective phases are given by:

$$\left.\begin{array}{l} V_u = V_B \cdot d_u \\ V_v = V_B \cdot d_v \\ V_w = V_B \cdot d_w \end{array}\right\} \qquad (3)$$

From expressions (2) and (3), the currents $i_u$, $i_v$ and $i_w$ of respective phases can be represented by the following expression using the duty ratios $d_u$, $d_v$ and $d_w$.

$$\left.\begin{array}{l} i_u = \dfrac{V_B}{3R} (2d_u - d_v - d_w) \\ i_v = \dfrac{V_B}{3R} (2d_v - d_w - d_u) \\ i_w = \dfrac{V_B}{3R} (2d_w - d_v - d_u) \end{array}\right\} \qquad (4)$$

Figure 6:
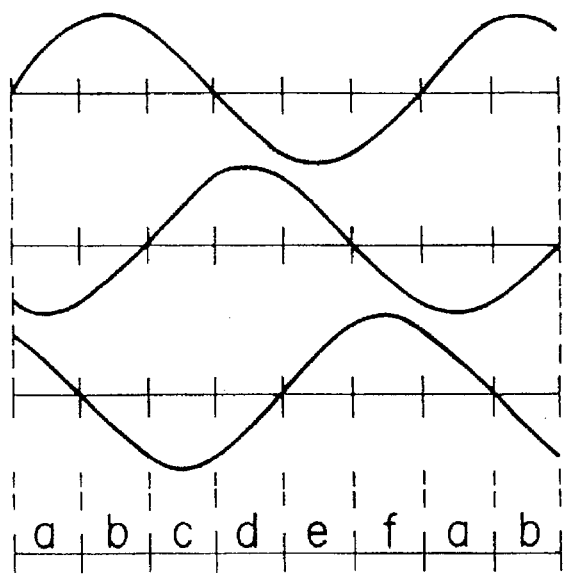
FIG. 6 is a diagram conventionally showing current waveforms of respective phases.

FIG. 6 is a diagram showing relative changes of the currents of respective phases. Currents of phases u, v and w are shown in FIG. 6(a), (b) and (c), respectively.

Figure 7:
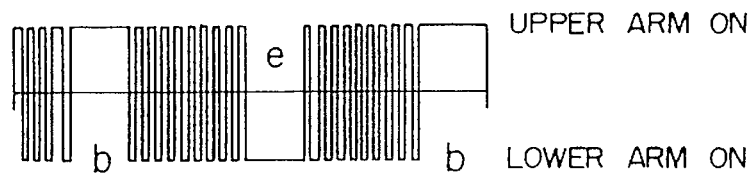
FIG. 7 is a diagram conventionally showing a chopping waveform of u phase.

In order to obtain currents of respective phases shown in FIG. 6 by using a control two-phase modulation method by way of example, control is effected by 60° division. FIG. 7 shows a chopping waveform for obtaining the u-phase current shown in FIG. 6(a). In the section b, the duty ratio is fixed to 1. In the section e, the duty ratio is fixed to 0. As for u-phase, the chopping upper arm is fixed to the on-state and the lower arm is fixed to the off-state in the section b. In the section e, the chopping upper arm is fixed to the off-state and the lower arm is fixed to the on-state. As for the chopping waveform in the v phase, the duty ratio is fixed to 0 in the section a, whereas the duty ratio is fixed to 1 in the section d. As for the chopping waveform in the w-phase, the duty ratio is fixed to 0 in the section c, whereas the duty ratio is fixed to 1 in the section f.

Letting $i_0 = V_B/2R$, denoting the current amplitude by $i_c$, and defining μ as $\mu = i_c/i_0$, it is understood from expression (4) representing the three-phase current that satisfying the following expression with the u-phase taken as the reference is satisfactory.

$$\left.\begin{array}{l} i_u = i_c \cdot \sin\theta = \mu \dfrac{V_B}{2R} \sin\theta \quad = \dfrac{V_B}{3R}(2d_u - d_v - d_w) \\[4pt] i_v = i_c \cdot \sin\left(\theta - \dfrac{2}{3}\pi\right) = \mu\dfrac{V_B}{2R}\sin\left(\theta - \dfrac{2}{3}\pi\right) \\[4pt] \qquad\qquad\qquad\qquad\qquad = \dfrac{V_B}{3R}(2d_v - d_w - d_u) \\[4pt] i_w = i_c \cdot \sin\left(\theta - \dfrac{2}{3}\pi\right) = \mu\dfrac{V_B}{2R}\sin\left(\theta - \dfrac{2}{3}\pi\right) \\[4pt] \qquad\qquad\qquad\qquad\qquad = \dfrac{V_B}{3R}(2d_w - d_u - d_v) \end{array}\right\} \qquad (5)$$

In the inverter apparatus of the present invention, therefore, chopping is effected for respective phases so that the following six expressions obtained by applying chopping conditions of respective phases described in expression (5) may be satisfied.

That is to say, when $0 \leq \theta < 1/3\pi$, $$\left.\begin{array}{l} d_u = 0.5\mu\sin\theta - 0.5\mu\sin\left(\theta - \dfrac{2}{3}\pi\right) \\[4pt] d_v = 0 \\[4pt] d_w = 0.5\mu\sin\left(\theta + \dfrac{2}{3}\pi\right) - 0.5\mu\sin\left(\theta - \dfrac{2}{3}\pi\right) \end{array}\right\} \qquad (6)$$

When $1/3\pi \leq \theta < 2/3\pi$, $$\left.\begin{array}{l} d_u = 1 \\[4pt] d_v = 1 - 0.5\mu\sin\theta + 0.5\mu\sin\left(\theta - \dfrac{2}{3}\pi\right) \\[4pt] d_w = 1 - 0.5\mu\sin\theta + 0.5\mu\sin\left(\theta + \dfrac{2}{3}\pi\right) \end{array}\right\} \qquad (7)$$

When $2/3\pi \leq \theta \leq \pi$, $$\left.\begin{array}{l} d_u = 0.5\mu\sin\theta + 0.5\mu\sin\left(\theta + \dfrac{2}{3}\pi\right) \\[4pt] d_v = 0.5\mu\sin\left(\theta - \dfrac{2}{3}\pi\right) - 0.5\mu\sin\left(\theta + \dfrac{2}{3}\pi\right) \\[4pt] d_w = 0 \end{array}\right\} \qquad (8)$$

When $\pi \leq \theta \leq 4/3\pi$, $$\left.\begin{array}{l} d_u = 1 + 0.5\mu\sin\theta - 0.5\mu\sin\left(\theta - \dfrac{2}{3}\pi\right) \\[4pt] d_v = 1 \\[4pt] d_w = 1 + 0.5\mu\sin\left(\theta + \dfrac{2}{3}\pi\right) - 0.5\mu\sin\left(\theta - \dfrac{2}{3}\pi\right) \end{array}\right\} \qquad (9)$$

When $4/3\pi \leq \theta < 5/3\pi$, $$\left.\begin{array}{l} d_u = 0 \\ d_v = -0.5\mu\sin\theta + 0.5\mu\sin\left(\theta - \frac{2}{3}\pi\right) \\ d_w = -0.5\mu\sin\theta + 0.5\mu\sin\left(\theta + \frac{2}{3}\pi\right) \end{array}\right\} \quad (10)$$

When $5/3\pi \leq \theta < 2\pi$, $$\left.\begin{array}{l} d_u = 1 + 0.5\mu\sin\theta - 0.5\mu\sin\left(\theta + \frac{2}{3}\pi\right) \\ d_v = 1 + 0.5\mu\sin\left(\theta - \frac{2}{3}\pi\right) - 0.5\mu\sin\left(\theta + \frac{2}{3}\pi\right) \\ d_w = 1 \end{array}\right\} \quad (11)$$

So long as each duty ratio is well within the range between 0 and 1, the conditional expressions (6) through (11) need not be completely satisfied.

These conditions are represented in Table 1.

TABLE 1

| | $0 \leq \theta < 60$ | $60 \leq \theta < 120$ | $120 \leq \theta < 80$ |
|---|---|---|---|
| u-phase | 0.5 μsin (θ) −0.5 μsin (θ − 120) | 1 | 0.5 μsin (θ) −0.5 μsin (θ + 120) |
| v-phase | 0 | 1 − 0.5 μsin (θ) +0.5 μsin (θ − 120) | 0.5 μsin (θ) −0.5 μsin (θ + 120) |
| w-phase | 0.5 μsin (θ + 120) −0.5 μsin (θ − 120) | 1 − 0.5 μsin (θ) +0.5 μsin (θ + 120) | 0 |

| | $180 \leq \theta < 240$ | $240 \leq \theta < 300$ | $300 \leq \theta < 360$ |
|---|---|---|---|
| u-phase | 1 + 0.5 μsin (θ) −0.5 μsin (θ − 120) | 0 | 1 + 0.5 μsin (θ) −0.5 μsin (θ + 120) |
| v-phase | 1 | −0.5 μsin (θ) +0.5 μsin (θ − 120) | 1 + 0.5 μsin (θ − 120) −0.5 μsin (θ + 120) |
| w-phase | 1 + 0.5 μsin (θ + 120) −0.5 μsin (θ − 120) | −0.5 μsin (θ) +0.5 μsin (θ + 120) | 1 |

A method for generating duty ratios satisfying the conditions of the expressions (6) through (11) featuring the present invention will hereafter be described.

Figure 8:
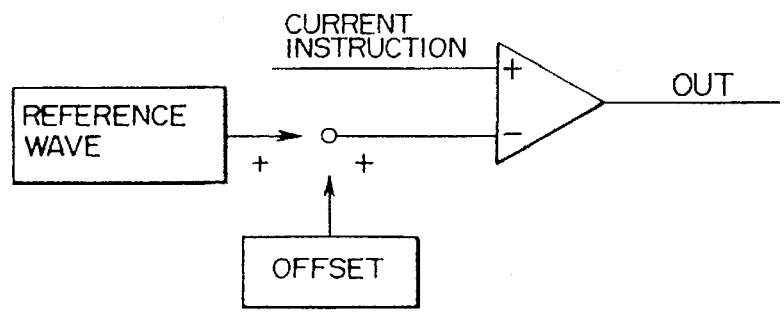
FIG. 8 is a diagram showing a circuit configuration of a principal part of the first embodiment.

That is to say, in an apparatus for comparing a current instruction with a reference wave by using a comparator and generating a duty ratio, the present invention applies offset voltage to a reference wave as shown in FIG. 8 to modify a duty ratio.

Denoting a current instruction value by S [V], the duty ratio is given by:

$$D = \frac{1}{V_{Tmax} - V_{Tmin}} (S - V_{Tmin} - OF) \quad (12)$$

When the reference wave is offset by OF [V], the duty ratio can be represented by:

$$D = \frac{1}{V_{Tmax} - V_{Tmin}} (S - V_{Tmin} - OF) \quad (13)$$

Figure 9:
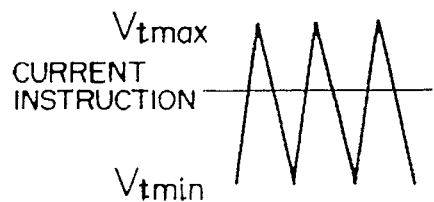
FIG. 9 is a diagram showing the relation between a current instruction and a reference wave in the first embodiment.
Figure 10:
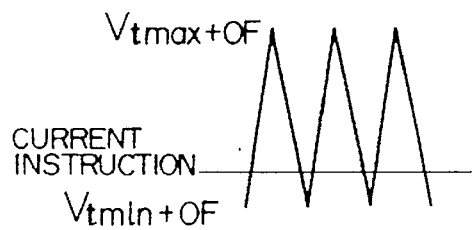
FIG. 10 is a diagram showing the relation between a current instruction and a reference wave having an offset in the first embodiment.

(Assuming that the reference wave has a triangular waveform, examples are shown in FIGS. 9 and 10.) Denoting current instruction values of phases u, v and w by $S_u$ [V], $S_v$ [V] and $S_w$ [V], respectively, for brevity, duty ratios $D_{su}$, $D_{sv}$ and $D_{sw}$ of respective phases can be represented by the following expression derived from expression (12).

$$\left.\begin{array}{l} D_{Su} = \frac{1}{V_{Tmax} - V_{Tmin}} (S_u - V_{Tmin}) \\ D_{Sv} = \frac{1}{V_{Tmax} - V_{Tmin}} (S_v - V_{Tmin}) \\ D_{Sw} = \frac{1}{V_{Tmax} - V_{Tmin}} (S_w - V_{Tmin}) \end{array}\right\} \quad (14)$$

From expression (13), duty ratios $D_{ou}$, $D_{ov}$ and $D_{ow}$ of respective phases each provided with an offset and compared are given by:

$$\left.\begin{array}{l} D_{ou} = \frac{1}{V_{Tmax} - V_{Tmin}} (S_u - V_{Tmin} - OF_u) \\ D_{ov} = \frac{1}{V_{Tmax} - V_{Tmin}} (S_v - V_{Tmin} - OF_v) \\ D_{ow} = \frac{1}{V_{Tmax} - V_{Tmin}} (S_w - V_{Tmin} - OF_w) \end{array}\right\} \quad (15)$$

Substituting expression (14) into expression (4), currents $i_u'$, $i_v'$ and $i_w'$ of respective phases are given by:

$$\left.\begin{array}{l} i_u' = \frac{V_B}{3R(V_{Tmax} - V_{Tmin})} (2S_u - S_v - S_w) \\ i_v' = \frac{V_B}{3R(V_{Tmax} - V_{Tmin})} (2S_v - S_w - S_u) \\ i_w' = \frac{V_B}{3R(V_{Tmax} - V_{Tmin})} (2S_w - S_u - S_v) \end{array}\right\} \quad (16)$$

Substituting expression (15) into expression (4) in the same way, currents $i_u''$, $i_v''$ and $i_w''$ modified by offset are given by:

$$\left.\begin{array}{l} i_u'' = \frac{V_B}{3R(V_{Tmax} - V_{Tmin})} (2S_u - S_v - S_w - 2 \cdot OF_u + OF_v + OF_w) \\ i_u'' = \frac{V_B}{3R(V_{Tmax} - V_{Tmin})} (2S_v - S_w - S_u - 2 \cdot OF_v + OF_w + OF_u) \\ i_w'' = \frac{V_B}{3R(V_{Tmax} - V_{Tmin})} (2S_w - S_u - S_v - 2 \cdot OF_w + OF_u + OF_v) \end{array}\right\} \quad (17)$$

Applying conditioning similar to expressions (6) through (11) to expression (17), $D_{ov}=0$ is typically obtained when $0 \leq \theta < 1/3\pi$. From exprssion (15), therefore, the following expression is obtained.

$$OF_v = S_v - V_{Tmin} \quad (18)$$

Substituting expression (18) into expression (17) gives $$\left.\begin{array}{l} i_u'' = \frac{V_B}{3R(V_{Tmax} - V_{Tmin})} (2S_u - S_w - 2 \cdot OF_u - V_{Tmin} + OF_w) \\ i_v'' = \frac{V_B}{3R(V_{Tmax} - V_{Tmin})} (-S_w - S_u + 2 \cdot V_{Tmin} + OF_w + OF_u) \\ i_w'' = \frac{V_B}{3R(V_{Tmax} - V_{Tmin})} (2S_w - S_u - 2 \cdot OF_w + OF_u - V_{Tmin}) \end{array}\right\} \quad (19)$$

Since expression (19) must be the same as expression (16), the following expression (20) is obtained.

$$\left.\begin{array}{l} OF_u = S_v - V_{Tmin} \\ OF_w = S_v - V_{Tmin} \end{array}\right\} \quad (20)$$

That is to say, it is understood that the offset is common to phases u, v and w and it can be produced easily by using $S_v$. At intervals of 60°, therefore, the following expression holds true.

If $\frac{1}{3} \pi \leq \theta < \frac{2}{3} \pi$, then $D_{ou} = 1$ and $OF = S_u + V_{Tmin}$ If $\frac{2}{3} \pi \leq \theta < \pi$, then $D_{ow} = 0$ and $OF = S_w - V_{Tmin}$ If $\pi \leq \theta < \frac{4}{3} \pi$, then $D_{ov} = 1$ and $OF = S_v + V_{Tmin}$  (21)

If $\frac{4}{3} \pi \leq \theta < \frac{5}{3} \pi$, then $D_{ou} = 1$ and $OF = S_u - V_{Tmin}$ If $\frac{5}{3} \pi \leq \theta < 2\pi$, then $D_{ow} = 1$ and $OF = S_u + V_{Tmin}$ If $D_{ou}$ through $D_{ow}$ are contained in the range between 0 and 1, offsets of expression (21) may be used irrespective of θ.

Figure 1:
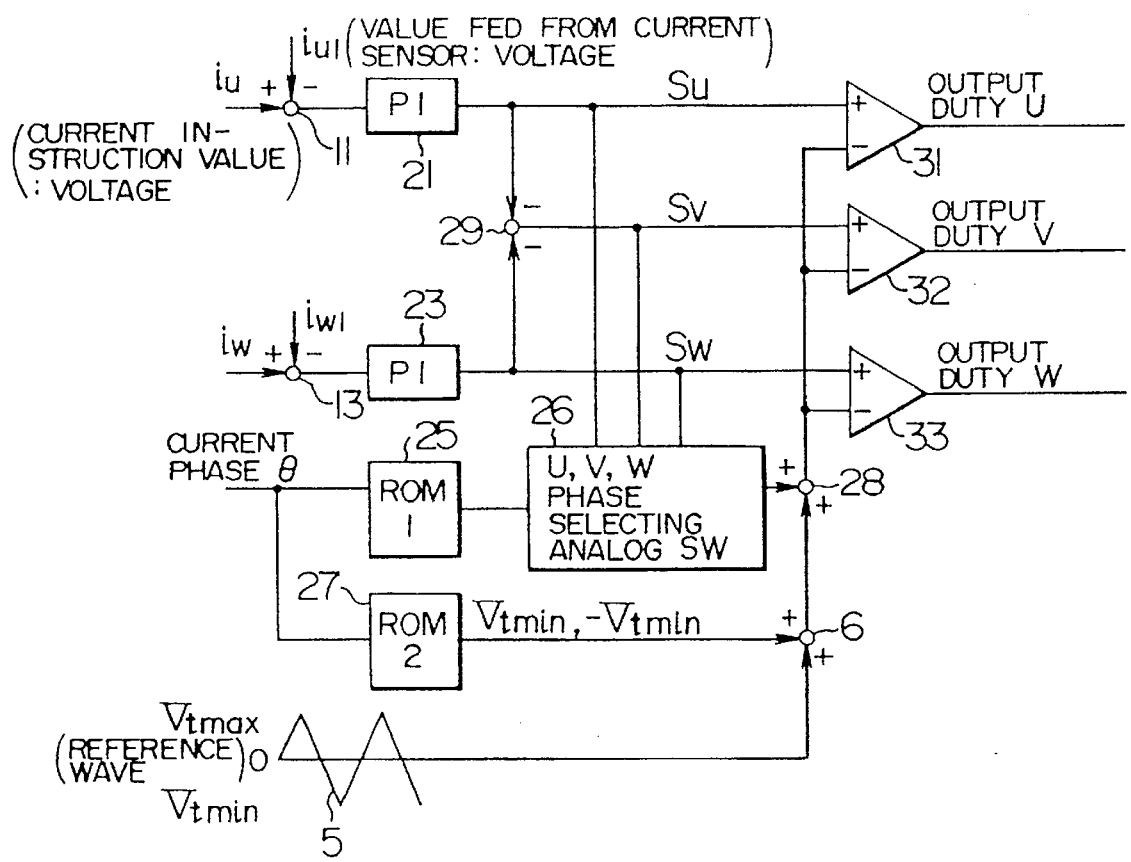
FIG. 1 is a diagram showing the circuit configuration of a duty ratio control apparatus of a three-phase inverter according to a first embodiment of the present invention.

A first embodiment of a circuit for adding offsets represented by the expressions (20) and (21) is shown in FIG. 1.

In FIG. 1, numeral 11 denotes a u-phase deviation calculator for calculating the deviation of an actual current value $i_{ul}$ of u-phase detected by a current sensor from the current instruction value $i_u$. In the same way, numeral 13 denotes a w-phase deviation calculator for calculating the deviation of an actual current value $i_{wl}$ of w-phase detected by a current sensor from the current instruction value $i_w$. The current instruction values correspond to drive instruction signals. The actual current values correspond to drive signals.

Numeral 21 denotes a u-phase PI calculator for effecting PI calculation on the deviation calculated by the u-phase deviation calculator 11. The u-phase PI calculator outputs the u-phase signal $S_u$ to be added to the motor. In the same way, numeral 23 denotes a w-phase PI calculator for effecting PI calculation on the deviation calculated by the w-phase deviation calculator 13. The w-phase PI calculator outputs the w-phase signal $S_w$ to be added to the motor. As for the v-phase signal $S_v$ to be supplied to the v-phase, it is derived by a subtractor 29 for performing subtraction between the u-phase signal $S_u$ and the w-phase signal $S_w$ on the basis of the expression (19).

In order to provide offset as shown in expression (21) at each phase θ on the basis of the phase θ of current instruction values $i_u$ and $i_w$, the circuit of FIG. 1 includes a first ROM 25, a phase selecting analog switch 26, a second ROM 27, a reference wave generator 5, an adder 6, and a second adder 28.

On the basis of the phase θ of the current instruction values $i_u$ and $i_w$, the first ROM 25 selects the u, v or w phase as the phase to be provided with offset and outputs the selected signal as offset data. By turning on the switch of the phase selected by the first ROM 25, the phase selecting analog switch 26 takes in one of the signals $S_u$, $S_v$ and $S_w$ respectively of the u, v and w phases.

Knowing the current phase θ, the second ROM 27 selects either the maximum value +Vtmin or the minimum value −Vtmin as the offset of the reference wave on the basis of expression (21) and outputs +Vtmin or −Vtmin for offsetting the reference wave. The reference wave generator 5 outputs a triangular waveform as shown in FIG. 1. The adder 6 adds the triangular waveform outputted from the reference wave generator 5 and +Vtmin or −Vtmin outputted from the second ROM 27, and outputs a resultant waveform. The second adder 28 adds the waveform resulting from addition in the adder 6 and one of the signals $S_u$, $S_v$ and $S_w$ taken in by the phase selecting analog switch 26, and outputs a resultant waveform.

Numeral 31 denotes a comparator for comparing the u-phase signal $S_u$ with the waveform outputted from the second adder 28 and calculating a duty signal of u-phase duty U (PWM signal of u-phase). In the same way, numeral 32 denotes a comparator for comparing the v-phase signal $S_v$ with the waveform outputted from the second adder 28 and calculating a duty signal of v-phase duty V (PWM signal of v-phase). Numeral 33 denotes a comparator for comparing the w-phase signal $S_w$ with the waveform outputted from the second adder 28 and calculating a duty signal of w-phase duty w (PWM signal of w-phase).

Operation of the first embodiment of the present invention having the above described structure will now be described.

On the basis of the phase θ of current, phase selecting data to be offset is inputted to the first ROM 25, and the signal $S_u$, $S_v$ or $S_w$ is selected according to the phase. Furthermore, data of Vtmax or −Vtmin is inputted to the second ROM 27 and then added to the triangular waveform. Thereby an offset represented by expression (22) can be obtained.

By making a comparison in comparators 31, 32 and 33 on the basis of the offset and the current signals $S_u$, $S_v$ and $S_w$ respectively of u, v and w signals, a PWM signal of two-phase modulation as shown in FIG. 7 can be obtained. On the basis of the PWM signal of two-phase modulation, switching elements of the inverter are controlled to drive the motor.

By effecting this control, chopping is stopped when a large current flows. Therefore, loss caused by chopping is reduced and calorific value is comparatively reduced. Furthermore, owing to the addition of offset, the essential duty ratio is lowered and the DC to AC conversion ratio can be increased to 2/√3 times.

Furthermore, in this two-phase modulation method, sine waveforms are used as the current instruction values $i_u$ and $i_w$ as shown in FIG. 6. Therefore, it is possible to derive deviation values of the current instruction values $i_u$ and $i_w$ respectively from the actual currents $i_{ul}$ and $i_{wl}$ to effect feedback control.

(Second Embodiment)

Figure 11:
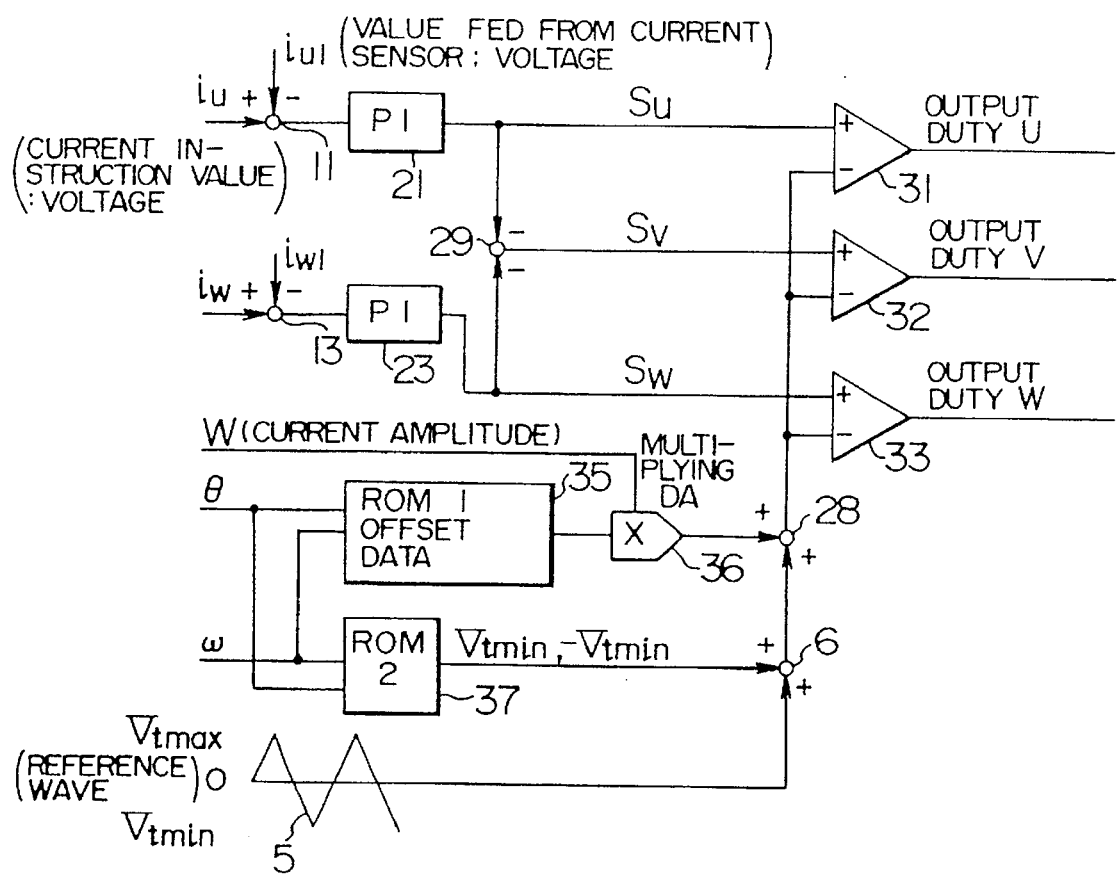
FIG. 11 is a diagram showing the circuit configuration of a second embodiment of the present invention.

A second embodiment of the present invention will now be described by referring to FIG. 11.

As for a method for providing the reference wave with offset thereby converting the duty ratio, current instruction values have been used in the above described first embodiment. Alternatively, offset voltage may be outputted from a ROM or the like in response to the current instruction. FIG. 11 shows a second embodiment of the present invention. The same components as those of the first embodiment are denoted by like characters and will not be described.

A first ROM 35 in the present embodiment is provided with the phase θ and the angular velocity ω of current as its inputs. On the basis of the phase θ and the angular velocity ω the current, the first ROM 35 calculates and outputs offset data in the same way as the first ROM 25 of the first embodiment. A current amplitude value W and offset data fed from the first ROM 35 are inputted to a multiplying DA converter 36. The multiplying DA converter 36 calculates the product of the current amplitude value W and the offset data. A second ROM 37 is provided with the phase θ and the angular velocity ω of current as its inputs. On the basis of the phase θ and the angular velocity ω of the current, the second ROM 37 outputs Vtmin or −Vtmin for offsetting the reference wave in the same way as the second ROM 27 of the first embodiment.

Figure 12:
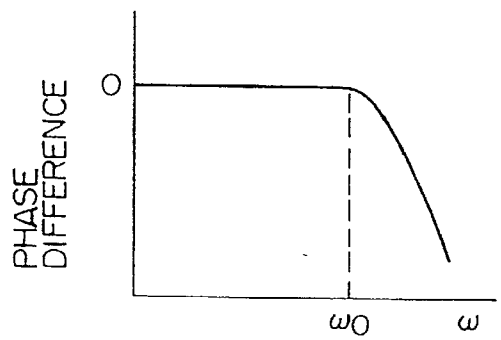
FIG. 12 is a diagram showing the relation between a frequency of a current and a phase difference in the second embodiment.

In general, when the frequency of the current becomes high, the phase difference is caused between the actual current and the current instruction value as shown in FIG. 12. When the largest current flows, therefore, chopping cannot be stopped. In the second embodiment, such a drawback is prevented.

By inputting binary map data of the phase θ and the angular velocity ω of the current to the first ROM 35 and the second ROM 37 as in the second embodiment, it becomes possible to shift the offset with respect to the angular velocity ω of current and stop the chopping properly.

(Third Embodiment)

A third embodiment of the present invention will now be described.

Figure 16:
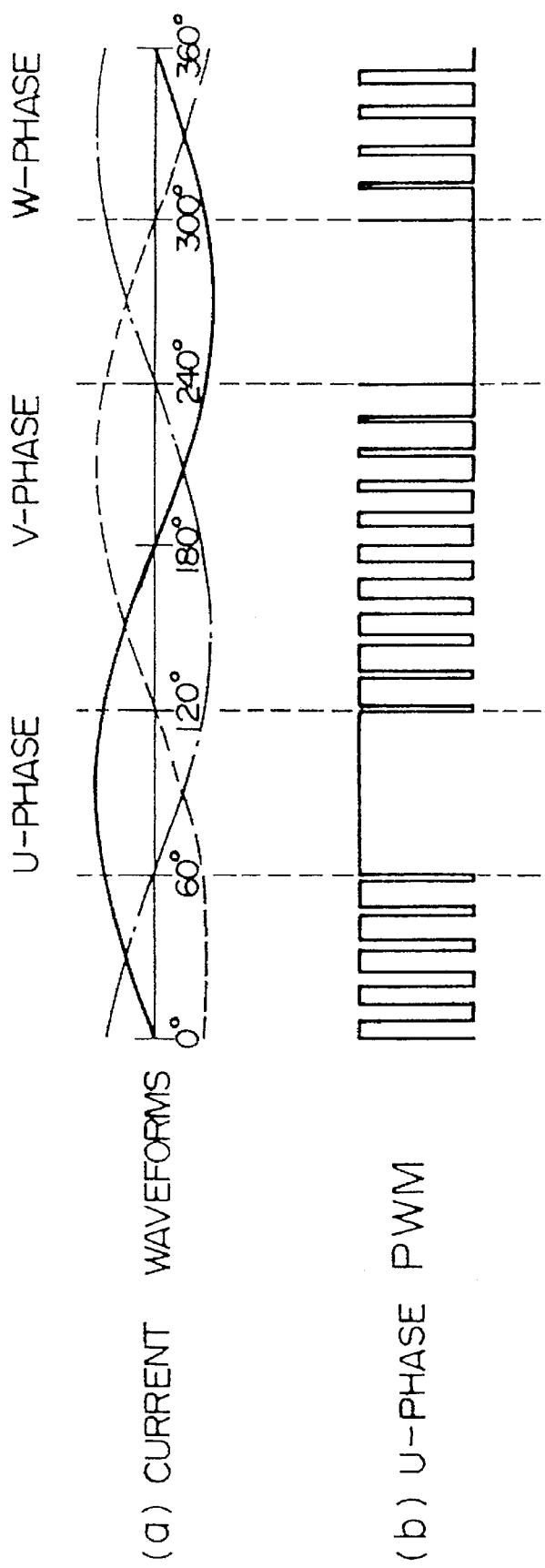
FIG. 16 is a diagram showing current waveforms of respective phases in the third embodiment, wherein (a) shows current waveforms and (b) shows a corresponding PWM waveform of u phase.

In the case where the two-phase modulation method is adopted as in the above described first and second embodiments, the section in which switching is stopped is set so as to be a portion centering around a point wherein the absolute value of current of each phase is maximized. That is to say, an ideal two-phase modulation PWM signal of u-phase for a three-phase alternating current as shown in FIG. 16(a) is represented as shown in FIG. 16(b).

Figure 17:
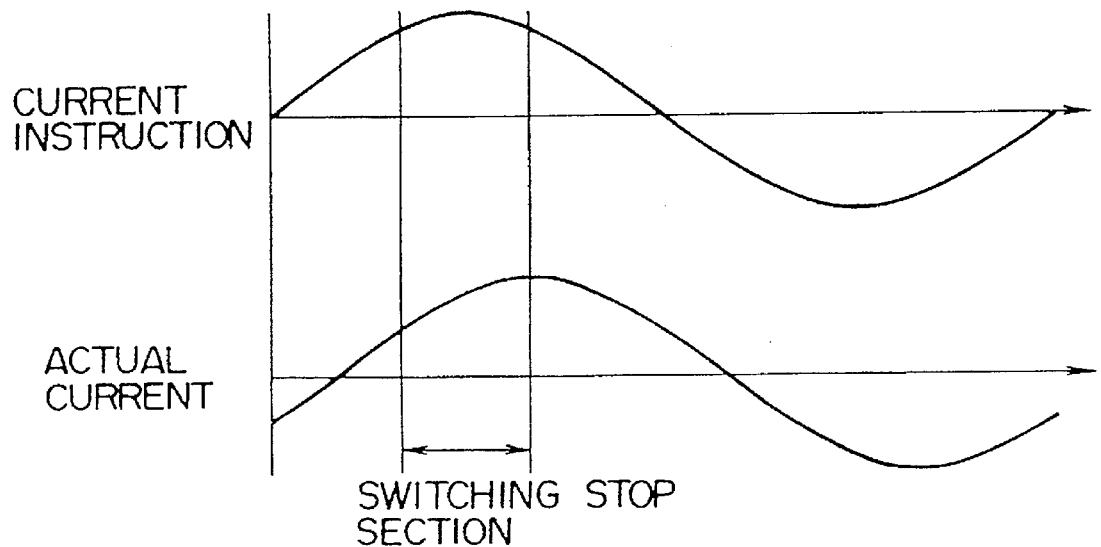
FIG. 17 is a diagram conventionally showing the relation between a current instruction value and an actual current.

As shown in FIG. 17, however, there is a difference between a current instruction value and an actual current actually flowing as the output of the inverter. If in such a state the switching stop section for generating a two-phase modulation PWM signal is set on the basis of the current instruction value, the switching stop section does not coincide with the portion having a large current value as shown in FIG. 17. As the rotation at speed of the current becomes higher, this phase difference is increased. Influences such as loss of efficiency, generation of an abnormal tone, and/or unachievable desired output are exerted.

For solving this problem, it is conceivable to perform two-phase modulation on the basis of the actual current. Since the actual current contains a large amount of noise and has a disturbed waveform, however, it is unreasonable to decide the switching stop section on the basis of the actual current.

Furthermore, in two-phase modulation, the potential of the phase abruptly changes when switching is stopped. This acts on the current control loop as a disturbance, makes the feedback loop unstable, and causes distortion in the actual current waveform.

In view of the above described problems, the present embodiment effects feedforward control for adding the phase lag caused by the motor to the current instruction, generates a two-phase modulation signal on the basis of the waveform with the phase lag added thereto, and makes the phase of the switching stop section such that it is derived on the basis of the current instruction coincident with the phase of the portion wherein the current value of the actual current is maximized.

Figure 15:
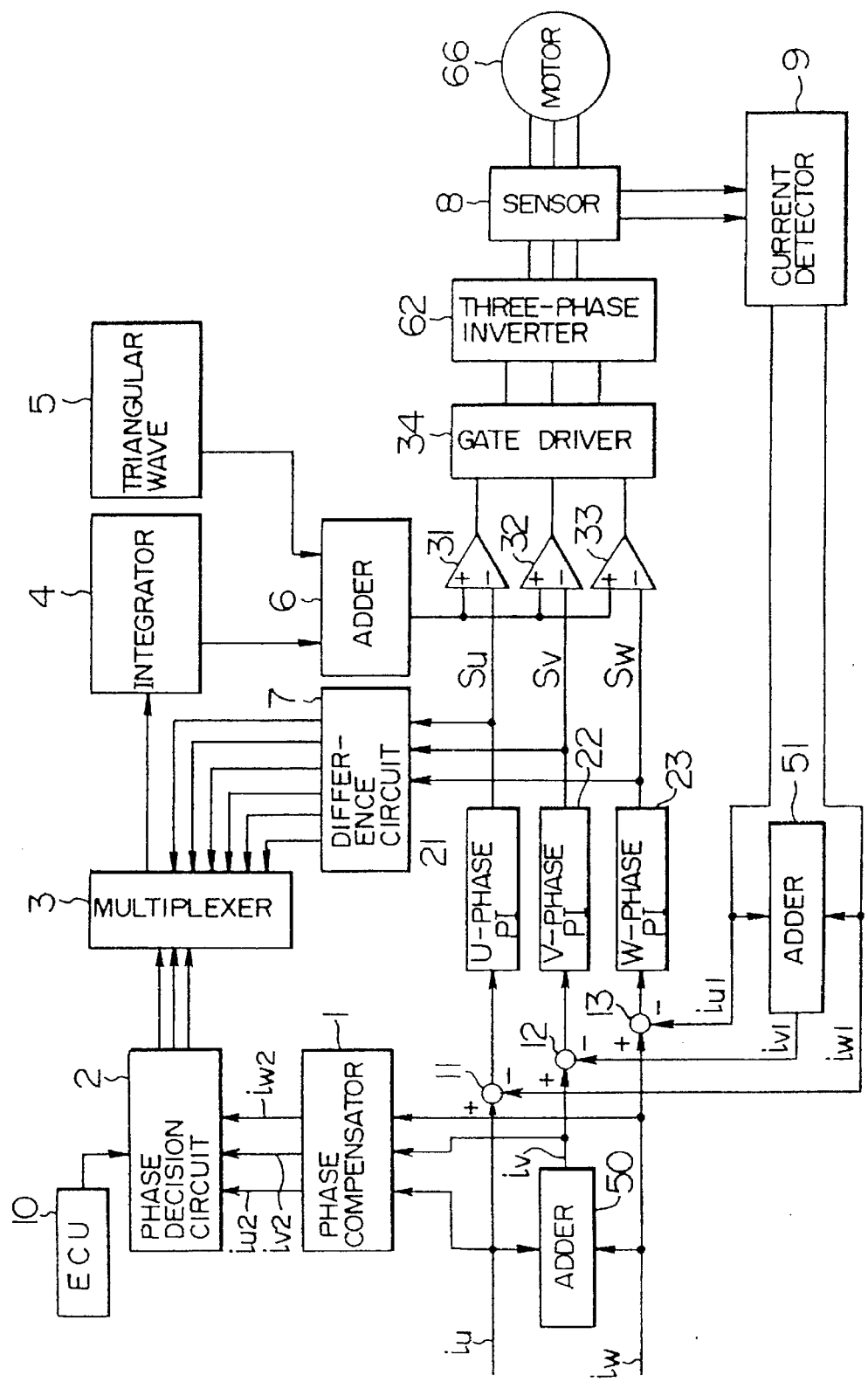
FIG. 15 is a diagram showing the circuit configuration of a third embodiment of the present invention.

Configuration of the third embodiment will now be described by referring to FIG. 15. In FIG. 15, the same components as those of the above described first and second embodiments are denoted by like numerals and will not be described.

In FIG. 15, numeral 1 denotes a phase compensator, 2 a phase decision circuit, 3 a multiplexer, 4 an integrator, 7 a difference circuit, 8 a current sensor, 9 a current detector, 10 an arithmetic processing unit (ECU), 12 a v-phase deviation calculator, 22 a v-phase PI calculator, and 34 a gate driver.

Figure 18:
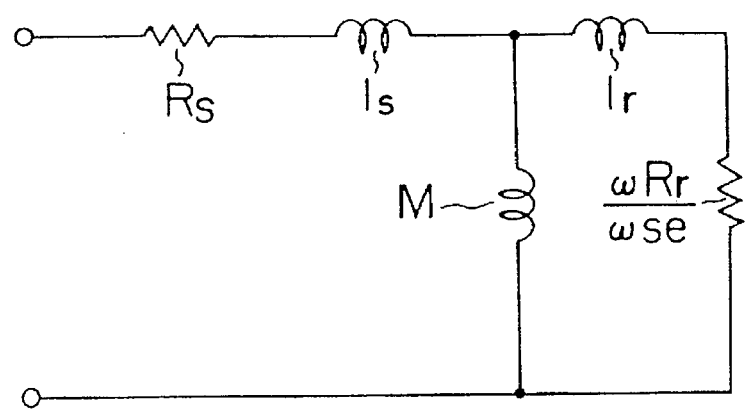
FIG. 18 is a diagram showing a conventional T-type equivalent circuit.
Figure 19:
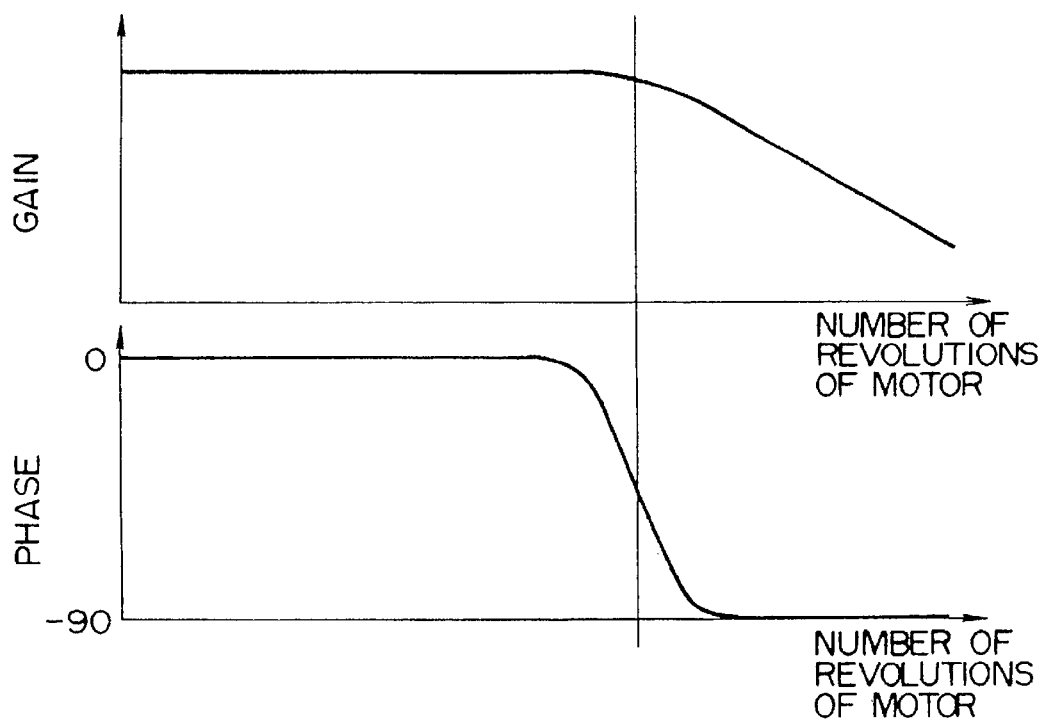
FIG. 19 is a Bode diagram of the T-type equivalent circuit shown in FIG. 18.

When motor control is effected, a T-type equivalent circuit as shown in FIG. 18 is most typically used as an equivalent circuit corresponding to one phase of an induction motor in the steady state. As for constants, Rs represents stator resistance, ls and lr inductance, M mutual inductance between windings, Rr rotor resistance, and ωse an angular velocity of a motor shaft. A Bode diagram obtained from this T-type equivalent circuit is shown in FIG. 19. That is to say, when the number of revolutions is high, a phase lag is produced and phase difference is caused between the current instruction value and the actual current.

Figure 20:
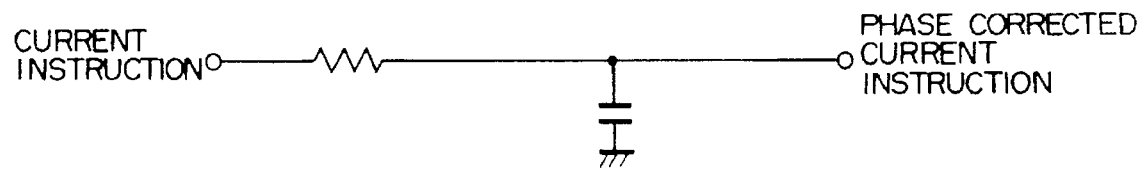
FIG. 20 is a diagram showing a phase compensating circuit in the third embodiment.

By applying a current instruction to a phase compensating circuit having a resistor and a capacitor as shown in FIG. 20 which functions as an equivalent to the T-type equivalent circuit of the motor, phase compensation is effected as feedforward control. This circuit is the phase compensator 1. Current instruction values $i_u$, $i_v$ and $i_w$ are inputted to the phase compensator 1. The phase compensator 1 effects phase compensation on the current instruction values $i_u$, $i_v$ and $i_w$, and outputs phase-compensated current instruction values $i_{u2}$, $i_{v2}$ and $i_{w2}$. By this phase compensator, the phase of the actual current waveform according to the number of revolutions of the motor at that time is predicted.

On the basis of the current instruction values $i_{u2}$, $i_{v2}$ and $i_{w2}$ subjected to phase compensation in the phase compensator 1, the phase decision circuit 2 obtains the present phase θ.

Furthermore, in the present third embodiment, attention is paid to what mode the current given as the instruction value is in, and its state is represented by a code.

It is now assumed that there is a three-phase AC curve as shown in FIG. 21A made equivalent in phase to the actual currents in the phase compensator 1. The instantaneous value of each phase is compared with the 0 level. When the instantaneous value is plus, a signal 0 is produced. When the instantaneous value is minus, a signal 1 is produced. It is understood that one period of three-phase alternating current is divided into six modes as shown in FIG. 21B by doing so. Since each of three phases is represented by 0 or 1, every mode is represented by a three-bit signal.

The number of states represented by three bits is eight. In addition to the states shown in FIG. 21B, a state in which every phase is plus and a state in which every phase is minus are conceivable. In the present embodiment, codes representing those modes are used for a different purpose, as will be described later. The phase decision circuit 2 for generating this three-bit signal is implemented by using comparators, each having a simple configuration as shown in FIG. 21C.

In the present invention, a PWM signal of two-phase modulation is obtained by deriving a difference between outputs of the PI calculators 21, 22 and 23 and the triangular wave shifted with offset. How to derive the amount of shift at this time will now be described by taking the case where the triangular wave is shifted.

Figure 22:
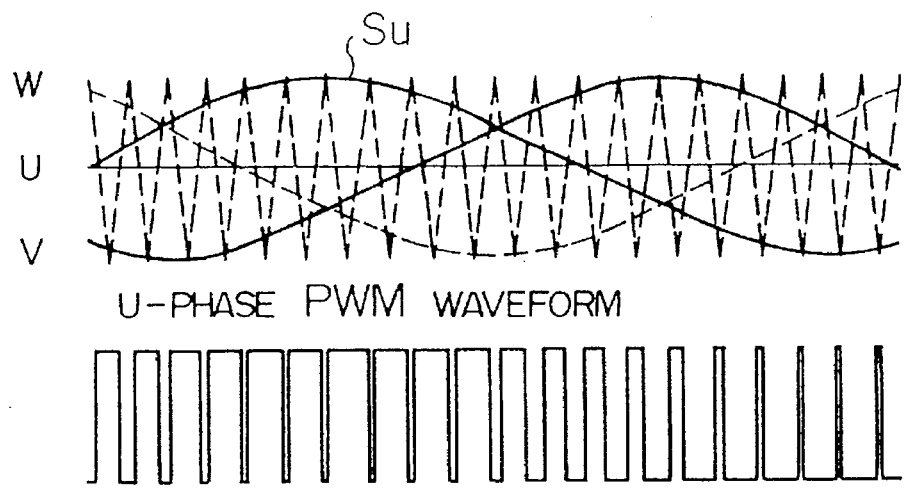
FIG. 22 is a diagram showing relations between signal voltage waveforms of respective phases and a triangular wave, and a modulated pulse train.
Figure 23:
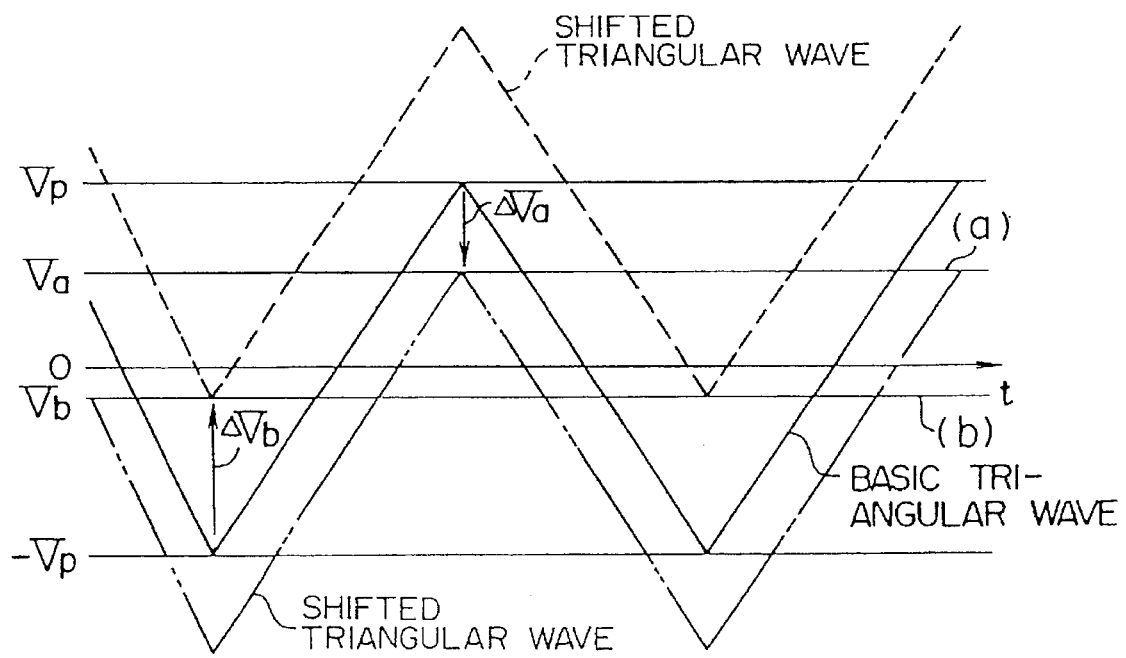
FIG. 23 is an expanded view of a part of FIG. 22 illustrating shifts of the triangular wave.

As shown in FIG. 22, the sinusoidal current instruction value of each phase is compared with the triangular wave in the three-phase modulation as well and a PWM waveform is generated according to which level is higher. FIG. 23 is an enlarged view of a portion of FIG. 22. For brevity, it is now assumed that the output of the u-phase PI calculator is represented by a horizontal straight line (a) of FIG. 23 and the potential thereof is Va. For making at this time the duty ratio of the PWM signal equivalent to 100% to attain two-phase modulation as in the present invention, it suffices that the positive peak of the triangular wave is Va. Denoting the shift value by ΔVa, therefore, the shift value ΔVa is derived by the following expression.

$$\Delta Va = Va - Vp = Va + (-Vp) \qquad (22)$$

That is to say, the shift value ΔVa can be derived by addition of the negative peak value of the triangular wave and the PI output.

In the case where the current instruction value is a straight line (b), a shift value ΔVb is derived by the following expression in the same way as the above described case.

$$\Delta Vb = Vb - (-Vp) = Vb + Vp \qquad (23)$$

That is to say, the shift value ΔVb can be derived by the addition of the positive peak value of the triangular wave and the PI output.

Figures 24, 25:
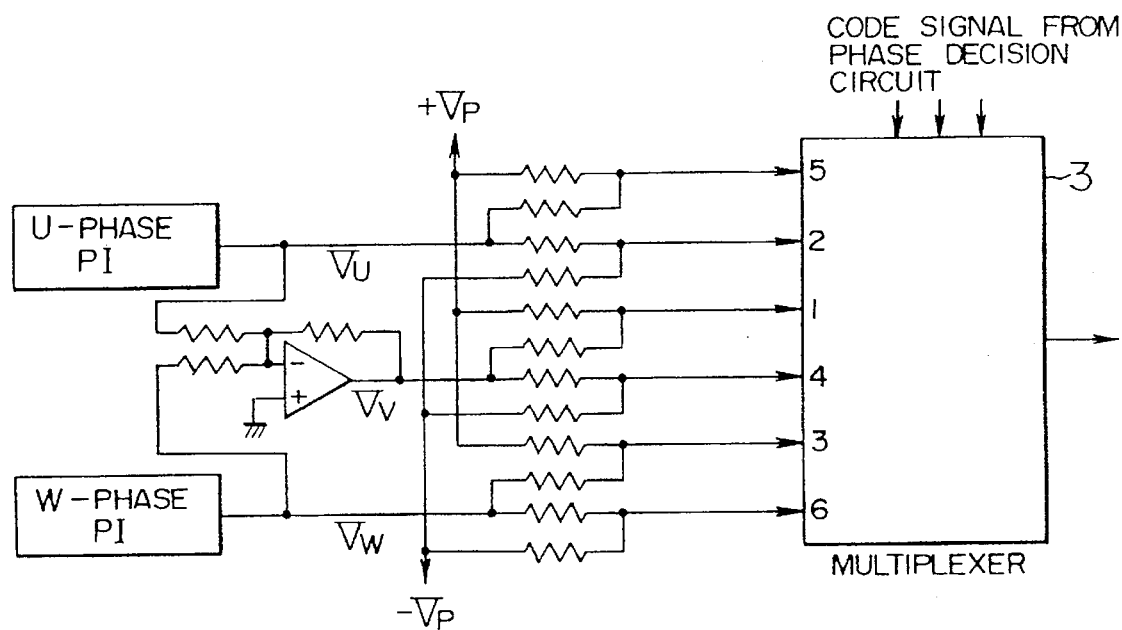
FIG. 24 is a diagram showing an adder in the third embodiment.
FIG. 25 is a diagram showing relations between codes and shift values in the third embodiment.

Shift values can be derived for other phases as well. It is thus understood that the shift value can be derived by adding the PI output and ± peak value of the triangular wave. The adder 6 for performing this addition can be implemented by a simple circuit including resistors as shown in FIG. 24. Thereby, it is possible to derive shift values of all modes and select proper shift values.

Calculation of this shift value and selection thereof will now be described in detail. Denoting potentials corresponding to PI outputs by $V_u$, $V_v$ and $V_w$, respectively, shift values for all modes are derived in the resistor circuit portion of FIG. 24. Shift values for respective modes are shown in FIG. 25. Out of them, a shift value conforming to the mode is selected by the multiplexer 3 shown in FIG. 24. In case the mode is [011], for example, an input terminal 2 is selected by the multiplexer 3 and hence the shift value becomes $V_u-V_p$.

Referring to FIGS. 14 and 15, the shift value outputted from the multiplexer 3 is inputted to the adder 6 via the integrator 4. The shift value is added to the level of the triangular wave in the adder 6 to yield a triangular wave having an offset. The triangular wave having an offset is inputted to the comparators 31, 32 and 33 and compared with $S_u$, $S_v$, and $S_w$, which are derived by effecting PI calculation on the current instruction values. Thus, conversion to duty ratios, i.e., PWM signals is conducted. Current instructions in the form of PWM signals are supplied to the three-phase inverter via the gate driver 34. As a result, input currents of the motor 66 flow according to the current instruction values.

At this time, the motor is controlled by using the two-phase modulation whereby switching of a specific phase is stopped. As a method of this two-phase modulation, the phase for which switching is stopped is determined according to the phase of the current instruction, and the instruction value for stopping switching is added to the triangular wave to produce a PWM waveform of two-phase modulation as described above.

By the way, the gate driver 34 receives PWM signals fed from the comparators 31, 32 and 33, and drives gates of the switching elements 620 through 625 of the three-phase inverter 62 to control the inverter. The sensor 8 is a current sensor for detecting actual currents supplied from the three-phase inverter 62 to drive the motor 66. It is satisfactory that the sensor 8 is capable of detecting any two phases. In this embodiment, currents of the u-phase and w-phase are detected. In the current detector 9, the actual currents detected by the sensor 8 are converted to actual current signals $i_{ut}$, $i_{vt}$ and $i_{wt}$ which can be compared with the current instruction values $i_u$, $i_v$ and $i_w$.

In the current detector 9, only the actual current signals $i_{ut}$ and $i_{wt}$ respectively of u-phase and w-phase are outputted on the basis of outputs of the current sensor 8. In an adder 51, the actual current signal $i_{vt}$ of v-phase is calculated from the two actual current signals $i_{ut}$ and $i_{wt}$ on the basis of the expression (2).

In the above described two-phase modulation, the phase is changed over every time the mode of current instruction is changed and at that time the duty ratio of each phase rapidly changes to change over the value. At this time, however, the average potential of each phase of the motor changes stepwise as represented by a solid line of FIG. 26 and the response of the current control minor loop cannot follow it, resulting in distortion in the current waveform. In order to prevent this, the integrator 4 including an operational amplifier 41, a capacitor 42, and a variable resistor 43 as shown in FIG. 27 is provided to moderate the stepwise change and decrease the disturbance supplied to the control system. As a result, the stepwise change of FIG. 26 is modified to become a change as represented by a broken line. The new change can settle down in the response range of the current control minor loop.

(Fourth Embodiment)

A fourth embodiment of the present invention will now be described.

In typical electric automobiles, a high voltage battery is used as the battery for travelling in order to obtain power for acceleration from the battery. Since a large amount of noise is caused by the switching operation of PWM control, and from the viewpoint of safety, this high voltage battery is not wired in the compartment.

Figure 28:
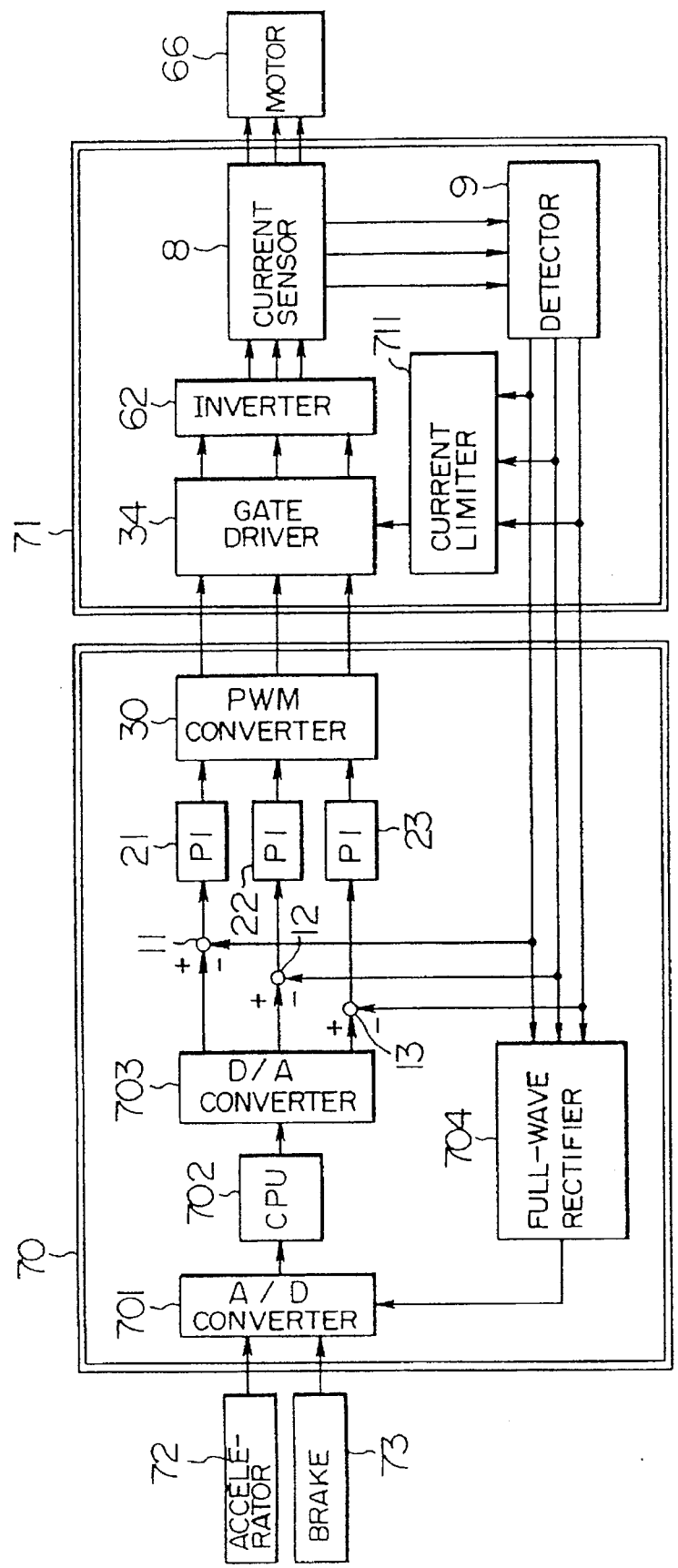
FIG. 28 is an entire configuration diagram of a conventional electric automobile control apparatus.

In mounting, therefore, the control apparatus is typically divided into two components, i.e., a signal processing unit 70 and a power control unit 71 as shown in FIG. 28. In the signal processing unit 70, motor current instruction values are produced by processing, in a CPU 702, the value 72 representing the degree of depression of the accelerator. From the deviation thereof from current detection signals detected by the power control unit 71, PI compensation is conducted to generate PWM control signals. In the power control unit 71, the inverter 62 is driven on the basis of the PWM control signals to let current flow through the motor 66 and the currents are detected by the sensor 8. If in this apparatus the current detection signals are lost due to a wire breaking failure or the like, the feedback control values are lost and hence excessively large currents flow through the motor. Furthermore, if PWM control signals are subjected to wire breaking, the inverter 62 cannot be driven normally and there is a possibility that an uncontrollable current flows. In designing an electric automobile, even a wire breaking failure must be considered. Thus, there is a problem that the interface specifications of the control apparatus become too complicated.

In the fourth embodiment, therefore, interface specifications are defined so as to allow automatic discrimination of a wire break failure, and a constant current control circuit unit is built in the power control unit 71 remove the analog power supply from the signal processing unit in the event of a wire break. Realization of lower cost and higher reliability is thus aimed at.

Figure 29:
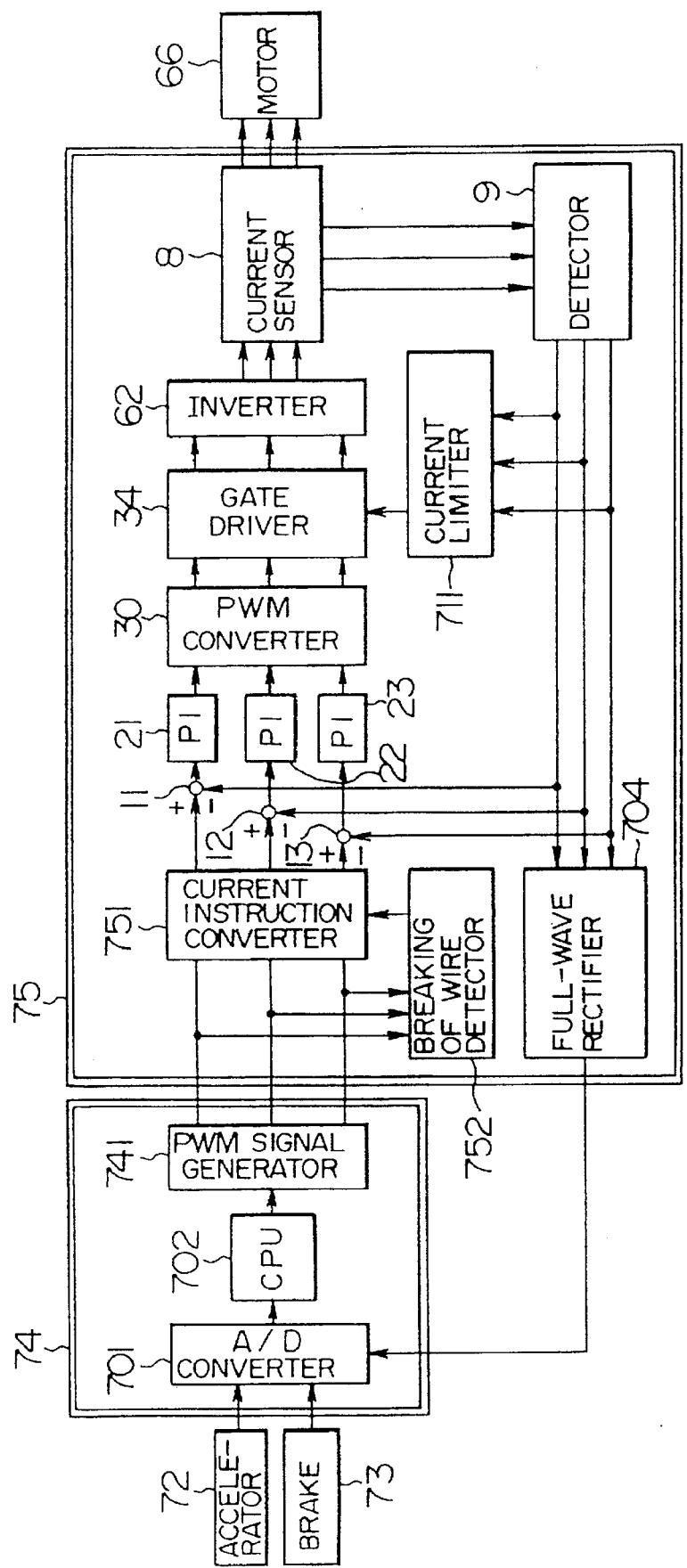
FIG. 29 is an entire configuration diagram of a fourth embodiment of the present invention.

In FIG. 29, a system configuration diagram of the fourth embodiment is shown.

In a signal processing unit 74, signals supplied from an accelerator 72 and a brake sensor 73 are read by an A/D converter 701. The signals are processed by a CPU 702. PWM signals are outputted as motor current instruction values by a PWM signal generator 741. In a power control unit 75, the PWM signals supplied from the PWM signal generator 741, which function as motor current instruction values, are converted to three-phase analog current instruction values by a current instruction converter 751. Output currents of an inverter 62 are detected by a current sensor 8. In deviation calculators 11, 12 and 13, deviation values respectively of inverter output currents respectively from the current instruction values set by the current instruction converter 751 are derived. The deviation values are inputted to PI compensators 21, 22 and 23, respectively, and feedback control of the minor loop is effected. Respective deviation values subjected to PI calculation are converted to duty signals by a PWM converter 30. The duty signals are coupled to a gate driver 34 to drive the inverter 62 and thereby control the motor 66.

To the gate driver 34, a current limiter 711 is connected. In the current limiter 711, it is determined whether there is an overcurrent in the output currents of the inverter. If there is an overcurrent, all gates of the gate driver 34 are turned off to stop the inverter and thereby protect the motor 66.

Three-phase current detection signals are converted to a DC level by a full-wave rectifier 704 and conveyed to the signal processing unit 74 as a motor current. The DC level is taken in the CPU 702 by the A/D converter 701 and compared with the motor current instruction value. Thereby, failure diagnosis can be made as to whether the current servo system is normal.

Since an AC current flows though the motor 66, a plus-minus power supply is required for the current detection and constant current control circuit in the power control unit 75. In the signal processing unit 74, however, the AC level is converted to a DC level by full-wave rectification and only the magnitude of the motor current is required. Therefore, only a single power supply circuit is needed for the signal processing unit 74. As compared with the apparatus shown in FIG. 28, the circuit configuration becomes closer in size to that of a gasoline automobile and a lower cost can be realized.

Interface specifications for improving the reliability will now be described.

Conversion of motor current instruction values to the PWM signals sent from the signal processing unit 74 to the power control unit 75 will now be described.

Since electric automobiles need starting and acceleration torque, vector control of an induction motor is adopted. In this vector control, sine currents flow through three phases, respectively. The following relations hold true.

$$I_u = I_p \cdot \sin(\omega t + \theta u) \quad (24)$$

$$I_v = I_p \cdot \sin(\omega t + \theta v) \quad (25)$$

$$I_w = I_p \cdot \sin(\omega t + \theta w) \quad (26)$$

$$I_u + I_v + I_w = 0 \quad (27)$$

As for the vector control, calculation processing in the CPU 702 yields a current amplitude instruction Ip and a phase instruction $\sin(\omega t + \theta)$. From expression (27), $I_w$ is derived by $I_w = -(I_u + I_v)$. For wiring of automobiles, system safety must be considered and acknowledge that a wire breaking failure might occur. For important signals, therefore, redundant design is demanded.

Figure 30:
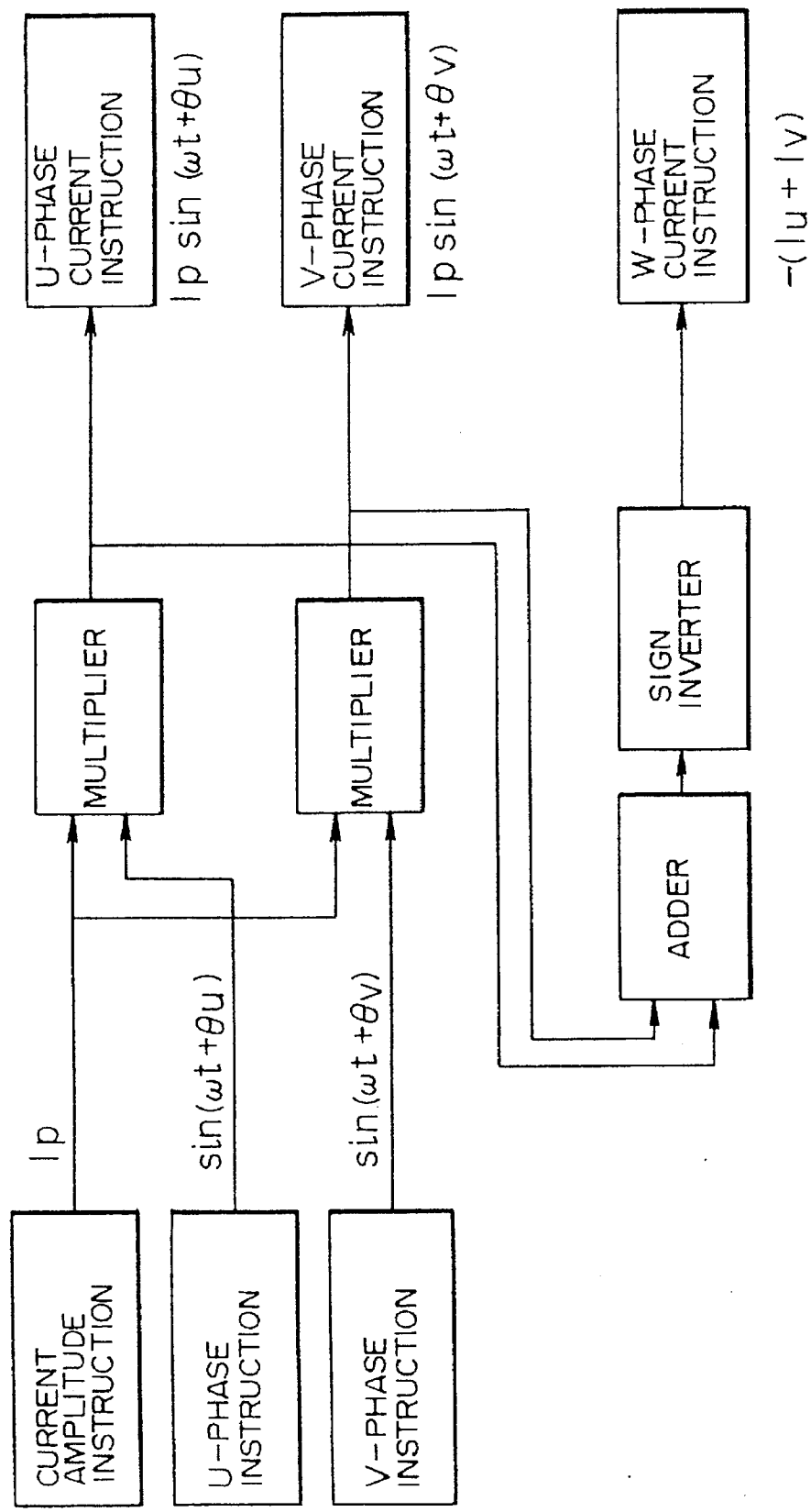
FIG. 30 is a detailed diagram of a current instruction converter in the fourth embodiment.

As shown in FIG. 30, three-phase current instructions are derived from the current amplitude instruction Ip and two phase instructions. If any signal is lost, outputs of multipliers become zero and hence current instructions of all phases become zero, resulting in redundant design. Furthermore, because of multiplication, the resolution becomes the product of resolution values.

Figure 31:
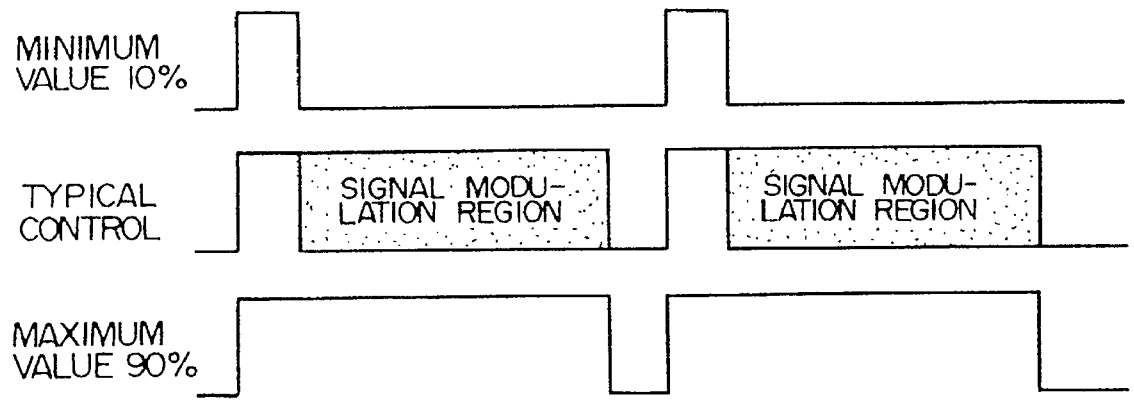
FIG. 31 is a diagram showing the duty ratio of a PWM signal in the fourth embodiment.

A minimum value and a maximum value are provided for the duty ratio of the PWM signals as shown in FIG. 31 so that each signal may change from 0 to 1 or from 1 to 0 without fail. By coupling this signal to a watchdog timer used for failure diagnosis of the microprocessor, a breaking of wire failure can be judged. For the signal modulation regions shown in FIG. 31, characteristics as shown in FIG. 32 are given.

Current amplitude instructions need only positive signals. Since phase instructions involve positive and negative signals, characteristics are set so that each phase instruction may become zero for the duty of 50%.

Figure 32:
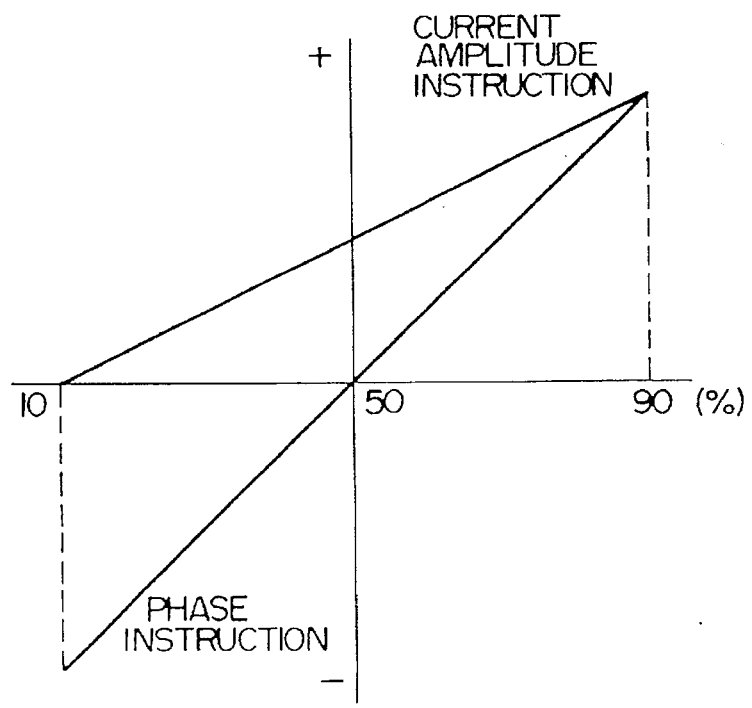
FIG. 32 is a characteristic diagram of a phase instruction signal and a current amplitude instruction signal in the fourth embodiment.
Figure 33:
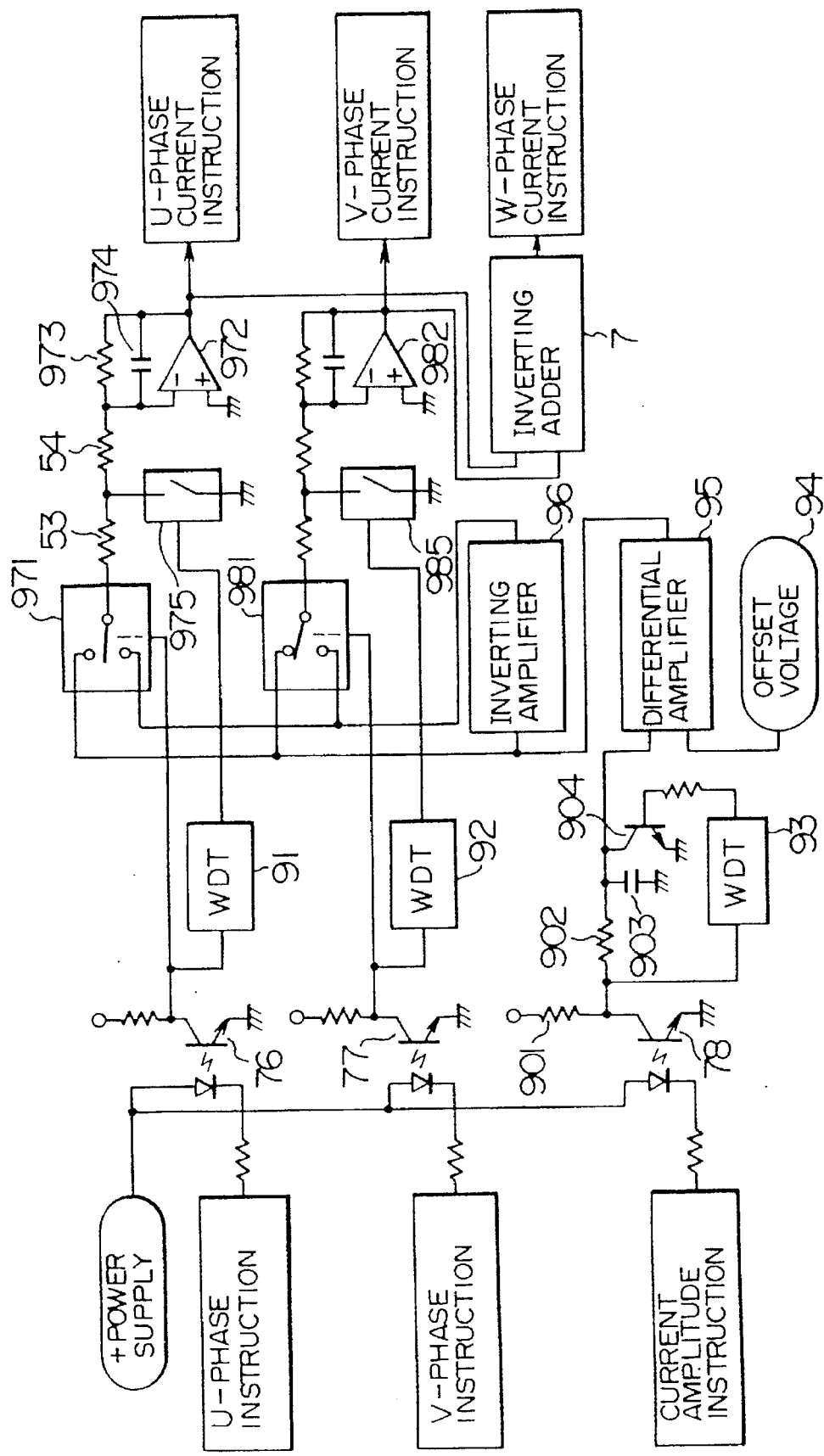
FIG. 33 is a configuration diagram of a current instruction converter having the characteristic of FIG. 32.

A circuit for implementing the characteristics of FIG. 32 is shown in FIG. 33.

As for interface between the signal processing unit 74 and the power processing unit 75, photocouplers 76, 77 and 78 are used to form current loops having high noise immunity. Thereby, a change in ground potential exerts no influence.

First of all, the photocoupler 78 is turned on/off by the current amplitude instruction signal. Since a resistor 901 has a value sufficiently smaller than that of a resistor 902, a signal of "0" or "1" is conveyed to a watchdog timer 93. Furthermore, a capacitor 903 is charged or discharged via the resistor 902. Therefore, if the frequency of a filter comprised of the resistor 902 and the capacitor 903 is set to a frequency sufficiently smaller than the PWM frequency of the current amplitude instruction, the PWM signal is converted to a DC level. Since the duty ratio of the PWM signal does not become less than the minimum value as shown in FIG. 31, an offset voltage corresponding to the minimum value is generated by an offset voltage generator 94. This offset voltage and output voltage of the capacitor 903 are coupled to a differential amplifier 95 to obtain the characteristics as shown in FIG. 32.

At this time, it is detected by the watchdog timer 93 whether a signal change of the photocoupler 78 is present or not. If there is no change, a transistor 904 connected in parallel to the capacitor 903 is turned on to make the current amplitude instruction zero.

The output voltage of the differential amplifier 95 is inputted to an inverting amplifier 96 (where amplification gain =1) to produce + and − signals of the current amplitude instruction.

The photocouplers 76 and 77 are connected to analog switches 971 and 981 and watchdog timers 91 and 92, respectively. The above described ± signals of the current amplitude instruction are connected to the analog switches. Depending upon the duty ratio of the phase instruction, a ± signal appears on the output of each analog switch. The ± signals are coupled to operational amplifiers 972 and 982, forming integrators via resistors. Since the filter frequency of the integrator formed by resistor 973 and a capacitor 974 is sufficiently lower than the PWM frequency, the ± signal is converted to a DC level in the same way as the current amplitude, resulting in current instruction values of respective phases. At this time, the charging current of the capacitor 974 is proportionate to the output voltage of the analog switch, i.e., the current amplitude instruction. Therefore, current instruction values of respective phases as shown in FIG. 30 are obtained.

If a wire breaking failure occurs in an input line for inputting a phase instruction signal, it is detected by the watchdog timer 91 or 92 and a shortcircuit to the ground potential is conducted by an analog switch 975 or 985. As a result, the output of the integrator 972 or 982 becomes zero. The output of the signal subjected to the wire breaking failure is automatically fixed to a safe side.

In the present embodiment, the analog output is fixed to zero by the watchdog timer 91, 92 or 93 as described above. Alternatively, the circuit may include a ROM and the inverter may be turned off according to the inhibition conditions of the inverter when any one of the conditions has been detected. Since the phase current frequency of a three-phase instruction motor is in the range between 0 and approximately 200 Hz as a matter of fact, the PWM frequency need only be at least 5 kHz, which is at least 20 times the phase current frequency. Thereby, the clock frequency of the CPU also becomes higher. If the clock frequency is 5 kHz=200 µs, the duty resolution of at least eight bits can be assured.

By configuring the above described first through third embodiments in the same way as the fourth embodiment, redundant design can be made for electric automobiles as well.

(Fifth Embodiment)

Figure 34:
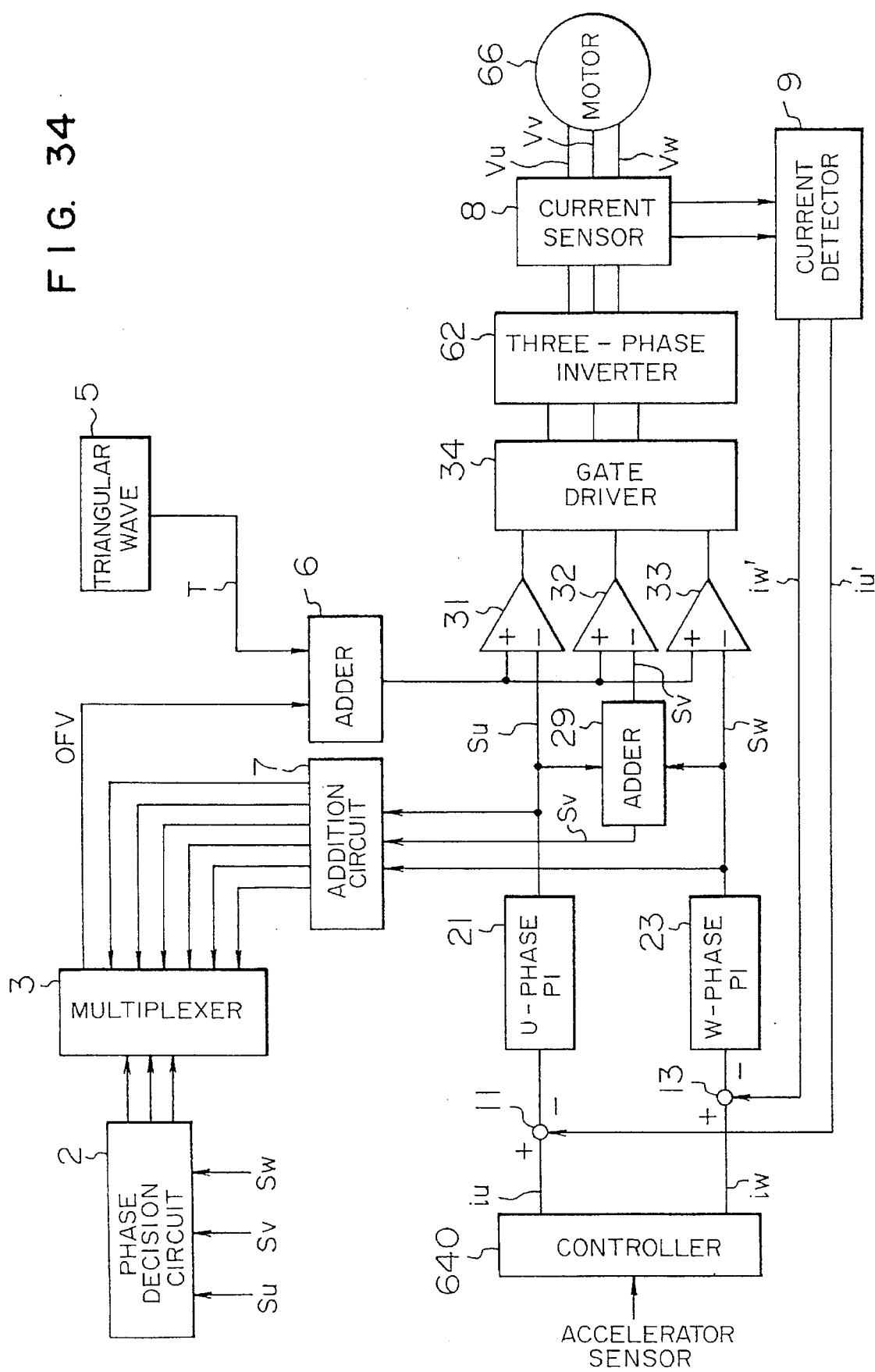
FIG. 34 is a block circuit diagram mainly of ECU (referred herein to inverter control apparatus) in a fifth embodiment.

A fifth embodiment of the present invention will now be described by referring to FIG. 34. In FIG. 34, the same components as those of FIG. 15 are denoted by like numerals.

Numeral 11 denotes a u-phase deviation calculator for calculating the deviation of an actual current value (detected current value) $i_u'$ of u-phase detected by a current sensor 8 from the current instruction value $i_u$. In the same way, numeral 13 denotes a w-phase deviation calculator for calculating the deviation of an actual current value $i_w'$ of w-phase detected by a current sensor 8 from the current instruction value $i_w$.

Numeral 21 denotes a u-phase PI calculator for effecting PI calculation on the deviation calculated by the u-phase deviation calculator 11. The u-phase PI calculator outputs the u-phase signal voltage $S_u$. In the same way, numeral 23 denotes a w-phase PI calculator for effecting PI calculation on the deviation calculated by the w-phase deviation calculator 13. The w-phase PI calculator outputs the w-phase signal voltage $S_w$. As for the v-phase signal voltage $S_v$ to be supplied to the v-phase, it is derived by adding the u-phase signal $S_u$ and the w-phase signal $S_w$ and inverting the sign in an inverting adder 29.

Furthermore in this embodiment, an ECU 64 includes a phase decision circuit 2 for making a decision on phase states of applied voltage $V_u$, $V_v$ and $V_w$ of respective phases applied to an induction motor 66 on the basis of signal voltage $S_u$, $S_v$ and $S_w$, an addition circuit 7, a multiplexer 3 for generating offset voltage OFV on the basis of a decision signal supplied from the phase decision circuit 2 and a signal supplied from the addition circuit 7, a triangular wave voltage generator 5, an adder 6, a controller 640, a gate driver 34, and a current detector 9.

The controller 640 is a circuit for generating current instruction values $i_u$ and $i_w$. The current instruction values $i_u$ and $i_w$ have a frequency and an amplitude determined according to a combination of an accelerator signal supplied from an accelerator sensor (which is not illustrated) and the number of revolutions of the motor 66 supplied from the rotary sensor 67. The current instruction values $i_u$ and $i_w$ are sine wave signals (which may be voltage signals or current signals) having mutual phase difference of 120 degrees. Since the controller 640 is not specific to the present invention, its description will be omitted.

The triangular wave generator 5 is a circuit for generating triangular voltage (which may also be a sawtooth voltage) T having a predetermined carrier (sampling) frequency.

The adder 6 is an addition circuit for adding the triangular voltage T and the offset voltage OFV and applying a resultant sum to a + input terminals of comparators 31 through 33.

The current detector 9 is a circuit for amplifying signals corresponding to the currents of u-phase and w-phase flowing to the motor 66 and detected by the current sensor 8 to a magnitude comparable to the current instruction values $i_u$ and $i_w$.

Operation of the circuit of FIG. 34 will now be described.

Deviations of actual current values $i_u'$ and $i_w'$ from the current instruction values $i_u$ and $i_w$ of u-phase and w-phase, respectively are calculated for respective phases and subjected to PI amplification to form signal voltages $S_u$ and $S_w$ respectively of u-phase and w-phase. By addition and inversion of signal voltages $S_u$ and $S_w$, signal voltage $S_v$ of v-phase is formed. The signal voltages $S_u$, $S_v$ and $S_w$ of respective phases are applied to the − input terminals of comparators 31, 32 and 33, respectively. Alternatively, deviations may be passed through filter circuits to extract only low-frequency components and apply PI amplification to them. Instead, only low-frequency components of detected currents may be taken out.

By the way, it is desirable to cut off high-frequency components of deviations or detected currents which are six times and preferably four times higher in frequency than the current instruction values.

A fact which is important here will now be described. In case the above described voltage level fixing is not conducted or in case, even if it is conducted, the applied voltages $V_u$, $V_v$ and $V_w$ of respective phases are successively fixed to maximum values or minimum values during predetermined phase intervals so as to conform to the peak interval or bottom interval of the applied voltages $V_u$, $V_v$ and $V_w$ of respective phases of the motor, distortion of the applied voltages $V_u$, $V_v$ and $V_w$ of respective phases already subjected to voltage fixing processing is not significant and the applied voltages $V_u$, $V_v$ and $V_w$ of respective phases can be processed by regarding them nearly as three-phase AC voltages. That is to say, signal voltages $S_u$, $S_v$ and $S_w$ corresponding to the deviations are signals having the same phases as voltages $V_u$, $V_v$ and $V_w$ of respective phases applied to the motor. This is the important fact. If phase relations of the signal voltages $S_u$, $S_v$ and $S_w$ are discriminated and intervals for fixing voltage levels are determined, therefore, phase deviation is reduced and waveform distortion of the applied voltages $V_u$, $V_v$ and $V_w$ of respective phases can be significantly reduced as compared with the conventional technique. On the basis of this finding, in this embodiment, the phase relations of signal voltages $S_u$, $S_v$ and $S_w$ are discriminated by the phase decision circuit 2 and thereupon offset voltage OFV for fixing the voltage level is generated by the multiplexer 3.

A method for making a phase decision by using the phase decision circuit 2 and a method for performing the voltage fixing by using the offset voltage OFV supplied from the multiplexer 3 will hereafter be described separately.

(Phase Decision Operation)

The phase decision operation conducted by the phase decision circuit 2 will now be described by referring to FIGS. 21A and 21B again. For brevity of description, an idealized model will be described.

It is now assumed that the influence of the above described voltage fixing is negligible in detected currents (actual current values) $i_u'$ and $i_w'$. Since current instruction values $i_u$ and $i_v$ are sine waves having phases mutually displaced by 120 degrees and having equal amplitudes, the detected currents $i_u'$ and $i_w'$ can be regarded as sine waves. As a result, three-phase signal voltages $S_u$, $S_v$ and $S_w$ can be regarded nearly as sine waves.

FIG. 21A shows the ideal waveforms of three-phase signal voltages $S_u$, $S_v$ and $S_w$.

On the basis of the amplitude of the three-phase signal voltages $S_u$, $S_v$ and $S_w$, one period can be divided into six intervals of modes 1 through 6. That is to say, one period can be divided into six modes as shown in FIG. 21B according to whether instantaneous values of AC components of the three-phase signal voltages $S_u$, $S_v$ and $S_w$ are positive or negative. Since each of three phases is represented by 0 or 1, all modes are represented by three-bit signals.

By the way, the number of states which can be represented by three bits is eight. In addition to the states shown in FIG. 21B, the case where every phase is plus and the case where every phase is minus can be considered. In the present embodiment, however, codes representing those modes are used for different purposes and will be described later. The phase decision circuit 2 can be implemented by using three comparators (not illustrated) for comparing three-phase signal voltages $S_u$, $S_v$ and $S_w$ with a reference voltage corresponding to instantaneous value of 0.

Since the detected currents $i_u'$ and $i_w'$ have distortion, respective modes are displaced from the above described model as a matter of fact. However, this is rather advantageous because the three-phase signal voltages $S_u$, $S_v$ and $S_w$ contain the above described distortion and hence voltage fixing can be conducted according to waveforms of actual three-phase signal voltages $S_u$, $S_v$ and $S_w$.

(Voltage Fixing Operation)

During the interval of each mode decided by the phase decision circuit 2, different voltages included in the applied voltages $V_u$, $V_v$ and $V_w$ of respective phases are successively selected and fixed to the maximum value or the minimum value. This operation will hereafter be described.

This embodiment uses a two-phase modulation method disclosed in U.S. pattern application Ser. No. 08/161853 filed on Dec. 8, 1993 and based on the Japanese Patent Application 5-262665, "Inverter Control Apparatus" by the present inventors (filed on Oct. 20, 1993). To be concrete, voltage fixing, i.e., two-phase modulation is conducted by modifying the offset voltage OFV of the triangular wave voltage T to be compared with the three-phase signal voltages $S_u$, $S_v$ and $S_w$. That is to say, although originally only the triangular wave is applied to inputs of comparators, offset voltage (shift value) OFV is added to the triangular wave and a resultant sum is inputted to comparators. As for specific phases, duty ratios of comparator outputs are fixed to 100% or 0%. Within the parentheses in FIG. 21A, relations between phases to be fixed and modes are shown.

This two-phase modulation method will hereafter be described.

In the conventional three-phase modulation as well, sinusoidal signal voltages of respective phases are compared with the voltage of the triangular wave and a PWM waveform is generated according to which level is higher as shown in FIG. 22. FIG. 23 is an expanded view of a part of FIG. 22. For brevity, only the u-phase is considered. It is now assumed that the output $S_u$ of the u-phase PI calculator, which is actually a curve, is represented by a straight line (a) of FIG. 23 and the potential thereof is Va. For making at this time the duty ratio of the PWM signal equivalent to 100% to attain two-phase modulation as in the present invention, it suffices to make a modification by adding an offset voltage so as to make the positive peak value of the triangular wave (output of the adder 6 in FIG. 34) equivalent to Va. Denoting the shift value by ΔVa, the shift value ΔVa is derived by the following expression.

$$\Delta Va = Va - Vp = Va + (-Vp)$$

Vp is the positive peak value of the triangular wave voltage T, and −Vp is the negative peak value of the triangular wave voltage T.

That is to say, the shift value ΔVa for making the duty ratio equivalent to 100% can be derived by adding the negative peak value −Vp of the triangular wave voltage T to the PI output $S_u$.

In other words, when the positive peak of the triangular wave slightly exceeds the level of the u-phase, the duty ratio is made large. When the negative peak of the triangular wave slightly exceeds the voltage level of the u-phase, the duty ratio is made small. Therefore, the duty ratio can be made equal to 100% by preventing the positive peak of the triangular wave from exceeding the level of the u-phase. The duty ratio can be made equal to 0% by preventing the negative peak of the triangular wave from exceeding the level of the u-phase.

It is now assumed that the output $S_v$ of the v-phase PI calculator is represented by a straight line (b) of FIG. 23 and the potential thereof is Vb. In this case, a shift value ΔVb for making the duty ratio equivalent to 0% is derived by the following expression in the same way as the above described case.

$$\Delta Vb = Vb - (-Vp) = Vb + Vp$$

That is to say, the shift value ΔVb can be derived by adding the positive peak value Vp of the triangular wave voltage T to the potential Vb of the PI output $S_v$.

Shift values can be derived for other phases as well in the same way. It is thus understood that the shift value for fixing the duty ratio to 100% or 0% can be derived by adding the potential of the PI output $S_v$ or $S_w$ and ± peak value (Vp or −Vp) of the triangular wave T. It is tabulated for respective modes and shown in FIG. 36.

Figures 35, 36:
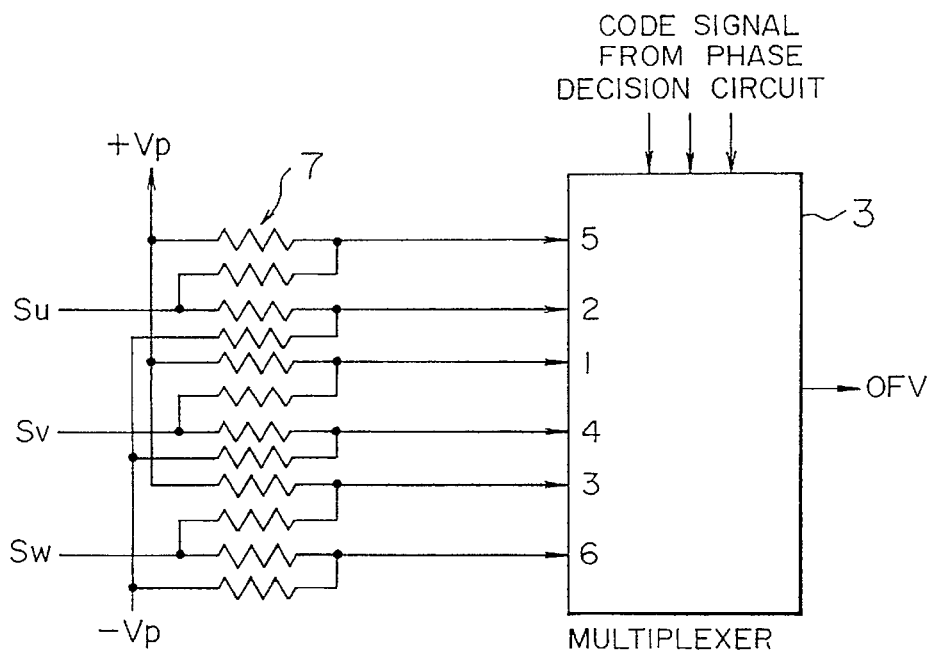
FIG. 35 is a diagram showing details of an adder illustrated in FIG. 34.
FIG. 36 is a diagram showing relations between modes and shift values, and duty ratios of a comparator output in the fifth embodiment.

The addition circuit 7 for performing this addition can be implemented by a simple circuit including a set of resistors as shown in FIG. 35. Thereby, it is possible to derive shift values of all of the above described modes 1 through 6 and select proper shift values.

Shift values for respective modes are shown in FIG. 36. The code shown in FIG. 36 is three-bit information shown in FIG. 21B and outputted from the phase decision circuit 2, and it indicates one of modes 1 through 6. Out of them, a shift value conforming to the mode is selected by the multiplexer 3 shown in FIG. 24. In case where the mode is [011], for example, an input terminal 2 is selected by the multiplexer 3 and hence the shift value becomes $S_u-V_p$.

The shift value (offset voltage) OFV outputted from the multiplexer 3 is inputted to the adder 6. The shift value OFV is added to the triangular wave voltage T in the adder 6 to yield a triangular wave voltage after modification having an offset.

The triangular wave voltage T with offset voltage OFV superimposed thereon is inputted to the comparators 31, 32 and 33 and individually compared with the three-phase signal voltages $S_u$, $S_v$ and $S_w$. Thus, conversion to duty ratios, i.e., PWM signals is conducted.

By doing so, the duty ratio of the comparator 32 is fixed to 0%, i.e., a low level in mode 1 as shown in the table of FIG. 36. In mode 2, the duty ratio of the comparator 31 is fixed to 100%, i.e., a high level. In mode 3, the duty ratio of the comparator 33 is fixed to 0%, i.e., the low level. In mode 4, the duty ratio of the comparator 32 is fixed to 100%, i.e., the high level. In mode 5, the duty ratio of the comparator 31 is fixed to 0%, i.e., the low level. In mode 6, the duty ratio of the comparator 33 is fixed to 100%, i.e., the high level. A two-phase modulation method having mutually different voltage fixing patterns of six kinds is thus realized.

Thereby, current instructions in the form of PWM signals are supplied to a three-phase inverter 62 via the gate driver 34. As a result, input currents of the motor 66 flow according to the current instruction values.

The output (offset voltage OFV) of the multiplexer 3 has a stepwise waveform. A sudden change of the duty ratio of a comparator to 100% or 0% might exert a bad influence upon the motor 66. In order to prevent this, the output of the multiplexer 3 may be made gentle in slope by using a low-pass filter or an integrating circuit.

(Sixth Embodiment)

In control of the three-phase inverter 62, two-phase modulation is not effective in all cases. In some cases, control using three-phase modulation is preferred. In such cases, a sixth embodiment hereafter described facilitates changeover between two-phase modulation and three-phase modulation.

The present embodiment uses a method of shifting a triangular wave in the stage of producing a PWM waveform of two-phase modulation. That is to say, if this shift value is made 0, it is not different at all from motor control using a PWM waveform of a conventional three-phase modulation method. Therefore, three AND circuits 44, 45 and 46 shown in FIG. 37 are provided on the output side of the phase decision circuit 2, and a circuit 47 for inputting outputs of the phase decision circuit 2 to AND circuits 44, 45 and 46 respectively is provided. In this circuit 47, each of the AND circuits 44, 45 and 46 is supplied with a "high" signal connected to a power supply (not illustrated) via a resistor 48 or a "low" signal connected to the ground via a switch SW. By turning on the switch SW shown in FIG. 26 according to an instruction supplied from the ECU 10, therefore, it is possible to input the "low" signal to three AND circuits 44, 45 and 46 and thereby output a code signal [000]. If the mode of the shift value 0, in which the phase to be offsetted is not provided, is associated with the code of [000] and this mode of shift value 0 is selected in the multiplexer 3, changeover between three-phase modulation and two-phase modulation can be conducted at an arbitrary timing.

By using the above described configuration, it is possible to obtain a waveform having reduced distortion irrespective of any variation of the power factor of the load caused by a change of frequency or current. In addition, the effect of reduction of switching loss by using two-phase modulation can be obtained over the entire region.

(Seventh Embodiment)

In the described examples of the embodiments, a triangular wave supplied to one input of each comparator is provided with an offset to effect two-phase modulation. Alternatively, each of the three-phase signal voltages $S_u$, $S_v$ and $S_w$ respectively supplied to remaining inputs of the comparators may be provided with an offset to effect two-phase modulation. This seventh embodiment will hereafter be described by referring to FIG. 38.

Figure 38:
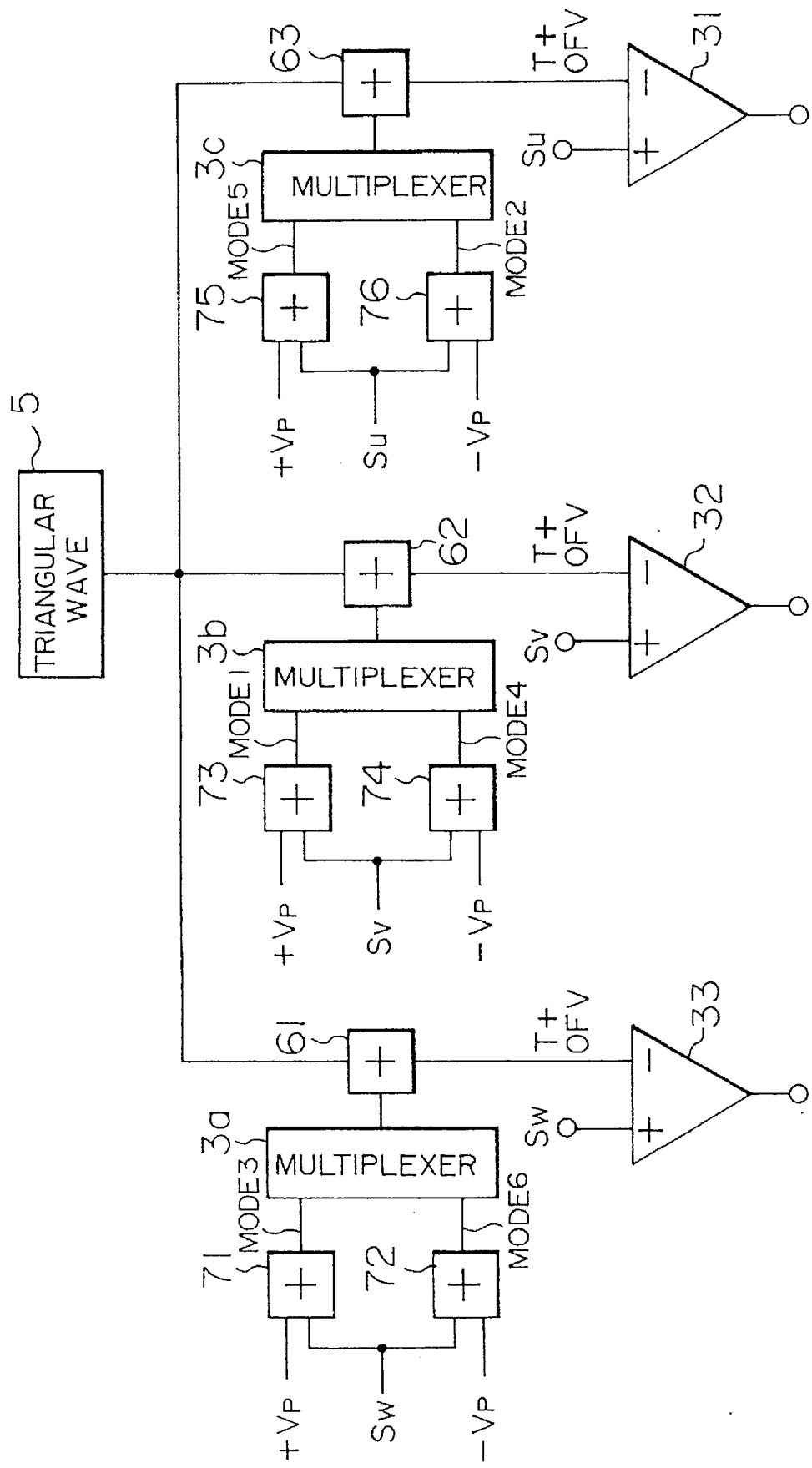
FIG. 38 is a partially electric, circuit diagram showing a principal part of a seventh embodiment.

The circuit of FIG. 38 has been obtained by changing the configuration of the multiplexer 3, the addition circuit 7 and the adder 6 of FIG. 34.

Numerals 71 through 76 denote adders.

Numeral 71 denotes a circuit for adding the positive peak value +Vp of the triangular wave voltage T and the signal voltage $S_w$ to generate the shift value of mode 3 shown in FIG. 36.

Numeral 72 denotes a circuit for adding the negative peak value −Vp of the triangular wave voltage T and the signal voltage $S_w$ to generate the shift value of mode 6 shown in FIG. 36.

Numeral 73 denotes a circuit for adding the positive peak value +Vp of the triangular wave voltage T and the signal voltage $S_v$ to generate the shift value of mode 1 shown in FIG. 36.

Numeral 74 denotes a circuit for adding the negative peak value −Vp of the triangular wave voltage T and the signal voltage $S_v$ to generate the shift value of mode 4 shown in FIG. 36.

Numeral 75 denotes a circuit for adding the positive peak value +Vp of the triangular wave voltage T and the signal voltage $S_u$ to generate the shift value of mode 5 shown in FIG. 36.

Numeral 76 denotes a circuit for adding the negative peak value −Vp of the triangular wave voltage T and the signal voltage $S_u$ to generate the shift value of mode 2 shown in FIG. 36.

In FIG. 38, 3a, 3b and 3c denote multiplexers.

The multiplexer 3a supplies the output of the adder 71 to an adder 61 when the three-bit signal outputted from the phase decision circuit 2 is (001). The multiplexer 3a supplies the output of the adder 72 to an adder 61 when the three-bit signal outputted from the phase decision circuit 2 is (110). In other cases, the multiplexer 3a turns off. As a result, the adder 61 outputs the triangular wave voltage T shifted by offset voltage OFV needed in mode 3 or 6 to a comparator 33.

The multiplexer 3b supplies the output of the adder 73 to an adder 62 when the three-bit signal outputted from the phase decision circuit 2 is (010). The multiplexer 3b supplies the output of the adder 74 to the adder 62 when the three-bit signal outputted from the phase decision circuit 2 is (101). In other cases, the multiplexer 3b turns off. As a result, the adder 62 outputs the triangular wave voltage T shifted by offset voltage OFV needed in mode 1 or 4 to a comparator 32.

The multiplexer 3c supplies the output of the adder 75 to an adder 63 when the three-bit signal outputted from the phase decision circuit 2 is (100). The multiplexer 3c supplies the output of the adder 76 to an adder 63 when the three-bit signal outputted from the phase decision circuit 2 is (011). In other cases, the multiplexer 3c turns off. As a result, the adder 63 outputs the triangular wave voltage T shifted by offset voltage OFV needed in mode 5 or 2 to a comparator 31.

Only while the triangular wave voltage T with each offset voltage OFV superposed thereon is supplied to the − input terminal, the output voltage of the comparator 31–33 is fixed to the high level or low level. During remining intervals, the three-phase signal voltages $S_u$, $S_v$ and $S_w$ are converted to a PWM signal by the triangular voltage T.

FIG. 39 is a block diagram showing the basic configuration of the inverter control apparatus according to the present invention. The inverter control apparatus according to the present invention includes an inverter for supplying drive signals associated with respective phases of a polyphase AC motor, signal generation means for supplying duty signals obtained by combining a reference waveform with output instruction signals to the inverter, and signal modification means for modifying the duty signals.

We claim:

1. An inverter control apparatus using a two-phase modulation method for driving a polyphase AC motor, the apparatus comprising:

an inverter provided with a plurality of duty signals associated with respective phases of said polyphase AC motor as inputs, said inverter outputting, to said polyphase AC motor, a plurality of drive signals associated with respective phases for driving said polyphase AC motor;

signal generation means provided with drive instruction signals for controlling respective phases of said inverter, said signal generation means having a reference waveform and generating said plurality of duty signals on the basis of said drive instruction signals and said reference waveform; and signal modification means for selecting one of said plurality of duty signals, holding the level of said selected duty signal under a predetermined condition, and modifying duty signals of other phases based on an amount used for holding the level of said selected duty signal.

2. The inverter control apparatus according to claim 1, wherein said signal modification means holds the level of one of said duty signals by changing over the level of said reference waveform and modifies duty signals of other phases.

3. The inverter control apparatus according to claim 1, wherein said signal modification means selects, on the basis of phases of said drive instruction signals, a phase whose duty signal is to be fixed.

4. The inverter control apparatus according to claim 1, wherein said signal modification means holds the level of one of said duty signals by changing over the level of said drive instruction signals and modifies duty signals of other phases.

5. The inverter control apparatus according to claim 1, wherein said signal generation means comprises:
  detection means for detecting drive signals of respective phases outputted from said inverter; and
  deviation calculation means for calculating deviation values of drive signals of respective phases detected by said detection means from said drive instruction signals of respective phases, and
  wherein said signal generation means generates duty signals on the basis of said deviation values calculated by said deviation calculation means and said reference waveform.

6. The inverter control apparatus according to claim 5, wherein said signal modification means fixes one of said duty signals by changing over the level of said deviation values and modifies duty signals of other phases.

7. The inverter control apparatus according to claim 6, wherein said inverter comprises a three-phase inverter having pairs of semiconductor switches, and each pair of semiconductor switches are connected in series across a power supply and provided with mutually inverted inputs by said signal generation means.

8. The inverter control apparatus according to claim 6, further comprising phase compensation means for predicting phase lag values of said drive signals with respect to said drive instruction signals and conducting phase compensation on said drive instruction signals.

9. The inverter control apparatus according to claim 5, wherein said signal modification means comprises:
  difference calculation means for calculating difference between the deviation value of the fixed phase and said reference waveform; and
  changeover means for offsetting said reference waveform according to the difference calculated by said difference calculation means, and
  wherein said signal modification means generates duty signals of other phases on the basis of said offsetted reference waveform.

10. The inverter control apparatus according to claim 9, further comprising signal modification inhibiting means for inhibiting holding of the level of a duty signal performed by said signal modification means.

11. The inverter control apparatus according to claim 9, further comprising moderating means for moderating the change of a duty signal in said signal modification means.

12. The inverter control apparatus according to claim 1, further comprising:
  an analog-to-digital converter for converting analog signals concerning motor manipulation and a motor current to digital signals and outputting said digital signals;
  a central control unit (CPU) provided with said digital signals as input thereof, said central control unit outputting motor current instruction values;
  a pulse width modulation (PWM) signal generator for receiving said motor current instruction values and outputting PWM signals of respective phases;
  a current instruction converter for receiving said PWM signals, converting said PWM signals to analog current instruction values of respective phases, and outputting said analog current instruction values;
  a wire breaking detector for monitoring states of signal lines coupling said CPU to said current instruction converter and for sending a warning to said current instruction converter in response to an occurrence of a wire break;
  a current detection circuit for detecting said motor drive current; and
  a full-wave rectifier for effecting full-wave rectification on motor drive currents detected by said current detection circuit and supplying the full-wave rectified motor drive currents to said analog-to-digital converter as said motor current, said CPU diagnosing a failure of said inverter control apparatus by comparing said motor drive currents with said motor current instruction values.

13. The inverter control apparatus according to claim 12, wherein said CPU outputs current amplitude instruction values and phase instruction values as motor current instruction values, and said PWM signal generator calculates said PWM signals from the products of said current amplitude instruction values and phase instruction values.

14. The inverter control apparatus according to claim 13, wherein said PWM signal generator further includes watchdog timers for monitoring said current amplitude instruction values and phase instruction values on respective input lines thereof, and when phases of said instruction value are interrupted for a fixed time, a current instruction signal associated therewith is short-circuited to the ground potential.

15. An inverter control apparatus capable of performing two-phase modulation by applying a three-phase AC voltage subjected to pulse width modulation to a motor, changing a frequency of the three-phase AC voltage to control a rotational speed of the motor, and holding the state of switching devices associated with specific devices among switching devices included in an inverter to a full conduction state or a full cutoff state, said inverter control apparatus comprising:
  means for outputting an accelerator signal, an acceleration of said motor being determined by said accelerator signal;
  current detection means for detecting currents of at least two phases flowing from said inverter to said motor;
  means for generating current instruction values of at least two phases determined according to said accelerator signal for accelerating said motor, said current instruction values of at least two phases including sine wave signals mutually differing in phase by a predetermined angle;
  deviation signal detection means for detecting deviation signals of respective phases representing deviations of detected current values detected by said current detection means from said current instruction values;
  phase decision means for deciding to which modes the phases of either said current instruction values or said deviation signals correspond and for generating mode signals;
  means for generating a triangular wave signal;
  means for calculating shift values respectively of said modes from the triangular wave signal and said deviation signals;
  means for selecting a specific shift value out of said shift values according to said mode signals;
  means for calculating pulse width modulation signals associated with said three phases by modifying one of said triangular wave signal and said deviation signals based on said specific shift value to hold a duty ratio of a pulse width modulation signal of a selected phase at a particular level;

means for modifying the duty ratios of pulse width modulated signals of other phases based on the specific shift value used to hold the duty ratio of the pulse width modulation signal of the selected phase; and gate drive means for supplying said pulse width modulation signals to said inverter as gate signals.

16. An inverter control apparatus comprising:

an inverter for applying voltages of respective phases to terminals of respective phases of a polyphase AC motor;

current detection means for detecting currents flowing through terminals of at least two phases of said motor;

current instruction value generation means for outputting current instruction values representing currents flowing through said motor;

signal generation means for effecting opening/closing control on said inverter on the basis of deviation signals depending upon deviations of said detected currents from said current instruction values and for determining waveforms of said voltages of respective phases applied to terminals of respective phases of said motor; and signal modification means for holding the levels of operation states of output stages of said inverter successively for respective modes indicating mutually different phase intervals determined in relation to said deviation signals.

17. The inverter control apparatus according to claim 16, wherein said signal modification means determines said modes indicating phase intervals on the basis of signals of respective phases obtained by amplifying deviations of said detected currents from said current instruction values.

18. The inverter control apparatus according to claim 17, wherein each of said current instruction values has a sine waveform.

19. The inverter control apparatus according to claim 16, wherein said signal modification means holds the level of an output state of one output stage out of all phases of said inverter to a maximum voltage level or a minimum voltage level, or holds each of said modes at either peak level indicating phase intervals.

20. The inverter control apparatus according to claim 17, wherein said signal modification means detects deviations of said detected currents from said current instruction values for respective phases and fixes a phase of a deviation which is opposite in positive/negative sign to deviations of two other phases among said deviations of respective phases.

21. The inverter control apparatus according to claim 16, wherein said signal modification means holds the levels of operation states of output stages of respective phases of said inverter successively at constant levels and modifies voltage waveforms of other phases according to a quantity required for holding the levels of said operation states.

22. The inverter control apparatus according to claim 16, wherein said signal generation means comprises a pulse width modulation signal generation means for determining voltage waveforms of respective phases on the basis of comparison of said deviation signals with a reference waveform, and wherein said signal modification means holds the level of said voltage waveform by changing over a level of at least one of said reference waveform and said deviation signal and modifies voltage waveforms of other phases.

23. The inverter control apparatus according to claim 22, wherein said signal generation means comprises:

difference calculation means for calculating difference between a deviation signal of a fixed phase and a peak value of said reference waveform, and changeover means for offsetting said reference waveform according to the difference calculated by said difference calculation means, and said signal generation means generates duty signals of other phases on the basis of a comparison of said offsetted reference waveform with deviation signals of other phases.

24. The inverter control apparatus according to claim 16, further comprising signal modification inhibiting means for inhibiting said signal modification means from fixing voltage waveforms.

25. An inverter control apparatus capable of performing two-phase modulation by applying a three-phase AC voltage subjected to pulse width modulation to a motor, changing a frequency of the three-phase AC voltage to control a rotational speed of the motor, and holding the state of switching devices associated with specific devices among switching devices included in an inverter to a full conduction state or a full cutoff state, said inverter control apparatus comprising:

means for outputting an accelerator signal, an acceleration of said motor being determined by said accelerator signal;

means for detecting a number of revolutions of said motor;

current detection means for detecting currents of at least two phases flowing from said inverter to said motor;

means for generating current instruction values of at least two phases determined according to said accelerator signal for accelerating said motor and the number of revolutions of said motor, said current instruction values of at least two phases including sine wave signals mutually differing in phase by a predetermined angle;

deviation signal detection means for detecting deviation signals of respective phases representing deviations of current values detected by said current detection means from said current instruction values;

phase decision means for deciding to which modes the phases of said deviation signals correspond and for generating mode signals;

means for generating a triangular wave signal;

means for calculating shift values respectively of said modes from a peak value of said triangular wave signal and said deviation signals;

means for selecting a specific shift value out of said shift values according to said mode signals;

means for calculating pulse width modulation signals associated with said three phases by modifying one of said triangular wave signal and said deviation signals based on said specific shift value to hold a duty ratio of a pulse width modulation signal of a selected phase at a particular level;

means for modifying the duty ratios of the pulse width modulated signals of other phases based on the specific shift value used to hold the duty ratio of the pulse width modulation signal of the selected phase; and gate drive means for supply said pulse width modulation signals to said inverter as gate signals.

26. The inverter control apparatus according to claim 25, further comprising means for making said shift value selecting means select a shift value of zero, inhibiting said two-phase modulation, and activating three-phase modulation.

* * * * *